United States Patent
Nakajima et al.

(10) Patent No.: US 6,807,134 B2
(45) Date of Patent: Oct. 19, 2004

(54) ASYMMETRY DETECTION APPARATUS, JITTER DETECTION APPARATUS, AND RECORDING/REPRODUCTION APPARATUS

(75) Inventors: Takeshi Nakajima, Nara (JP); Shinichi Konishi, Nara (JP); Harumitsu Miyashita, Minoo (JP); Toshihiko Takahashi, Kawachinagano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 199 days.

(21) Appl. No.: 09/749,079

(22) Filed: Dec. 27, 2000

(65) Prior Publication Data

US 2001/0006500 A1 Jul. 5, 2001

(30) Foreign Application Priority Data

Dec. 28, 1999 (JP) ............................................. 11-372653

(51) Int. Cl.[7] ................................................. G11B 5/09
(52) U.S. Cl. ................................. 369/47.35; 369/59.21; 369/124.05
(58) Field of Search ........................... 369/47.18, 47.35, 369/59.21, 59.22, 59.17, 59.18, 59.19, 59.2, 124.05, 124.14, 124.15, 44.34, 53.31, 5.35, 53.36, 47.17, 47.28, 47.51, 53.12

(56) References Cited

U.S. PATENT DOCUMENTS

| | | | | |
|---|---|---|---|---|
| 5,045,950 A | * | 9/1991 | Iwamura et al. | 386/12 |
| 5,848,036 A | * | 12/1998 | Ishibashi et al. | 369/44.35 |
| 6,100,724 A | * | 8/2000 | Yoshimura et al. | 369/53.34 |
| 6,188,656 B1 | * | 2/2001 | Shoji et al. | 369/47.25 |
| 6,246,650 B1 | * | 6/2001 | Kuroiwa | 369/47.38 |
| 6,324,144 B1 | * | 11/2001 | Won et al. | 369/59.22 |
| 6,381,203 B1 | * | 4/2002 | Muramatsu | 369/47.17 |
| 6,426,926 B1 | * | 7/2002 | Sonu | 369/47.17 |

FOREIGN PATENT DOCUMENTS

| | | |
|---|---|---|
| JP | 63-048617 A | 3/1988 |
| JP | 05-197957 A | 8/1993 |
| JP | 05-266481 A | 10/1993 |
| JP | 06-124493 A | 5/1994 |
| JP | 06-176430 A | 6/1994 |
| JP | 07-129959 A | 5/1995 |
| JP | 08-124160 A | 5/1996 |
| JP | 09-167347 A | 6/1997 |
| JP | 10-091960 A | 4/1998 |

\* cited by examiner

*Primary Examiner*—Thang V. Tran
(74) *Attorney, Agent, or Firm*—Akin Gump Strauss Hauer & Fled, L.L.P.

(57) ABSTRACT

An asymmetry detection apparatus includes: a clock signal generator for generating a clock signal based on a reproduced signal; an A/D converter for sampling the reproduced signal in synchronization with the clock signal; a determiner for determining whether a level of each of a plurality of sampled data obtained by the sampling operation is equal to or greater than a predetermined level; and a detector for detecting asymmetry in the reproduced signal by using predetermined ones of the sampled data based on an output from the determiner. A jitter detection apparatus includes: a clock signal generator for generating a clock signal based on a reproduced signal; an A/D converter for sampling the reproduced signal in synchronization with the clock signal; a determiner for determining whether a level of each of a plurality of sampled data obtained by the sampling operation is equal to or greater than a predetermined level; and a detector for detecting jitter in the reproduced signal by using predetermined ones of the plurality of sampled data based on an output from the determiner.

16 Claims, 16 Drawing Sheets

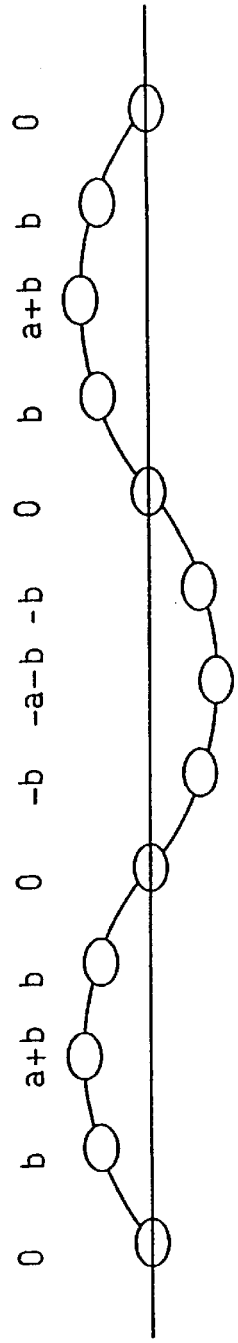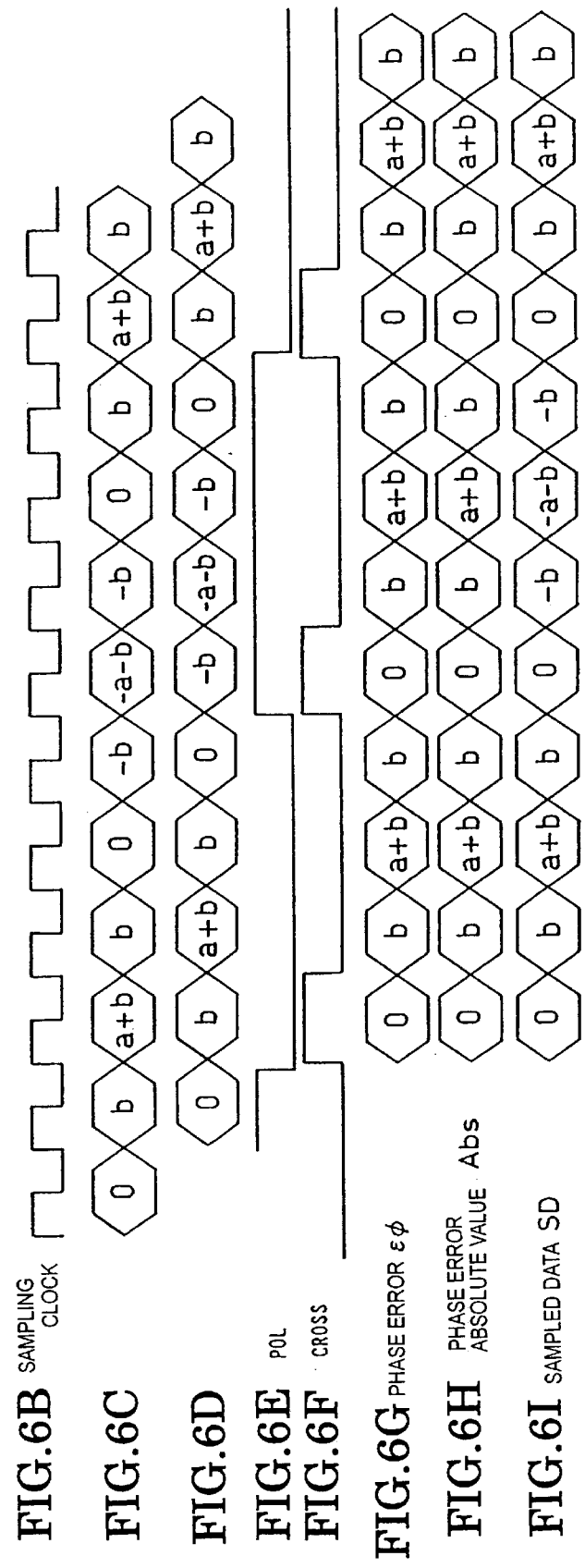

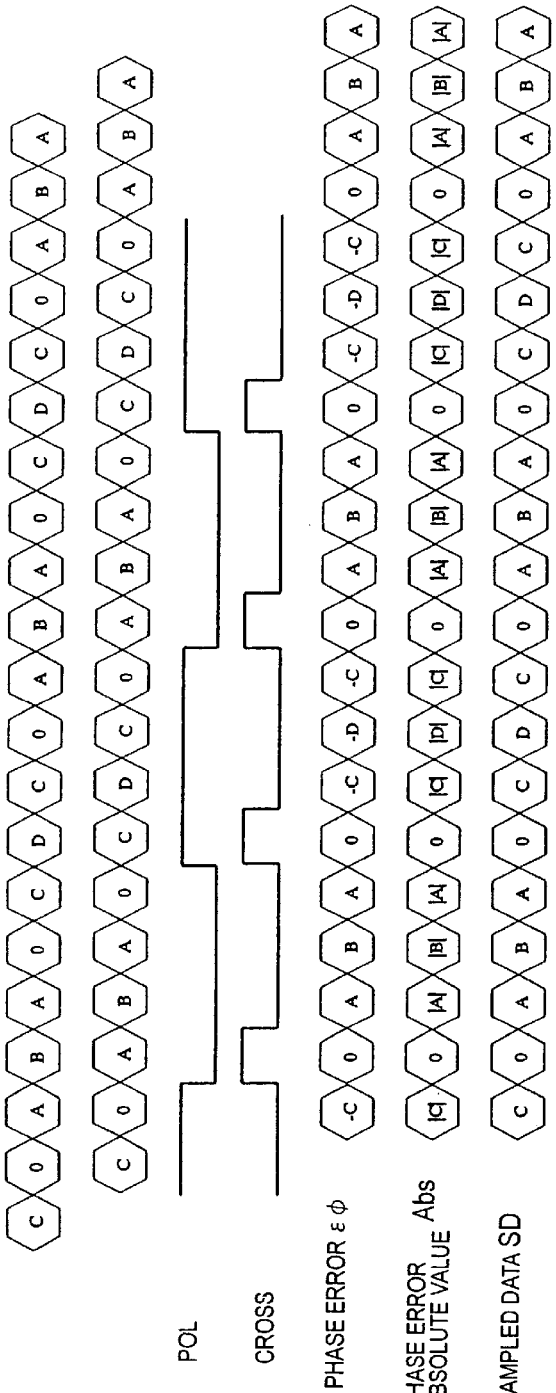

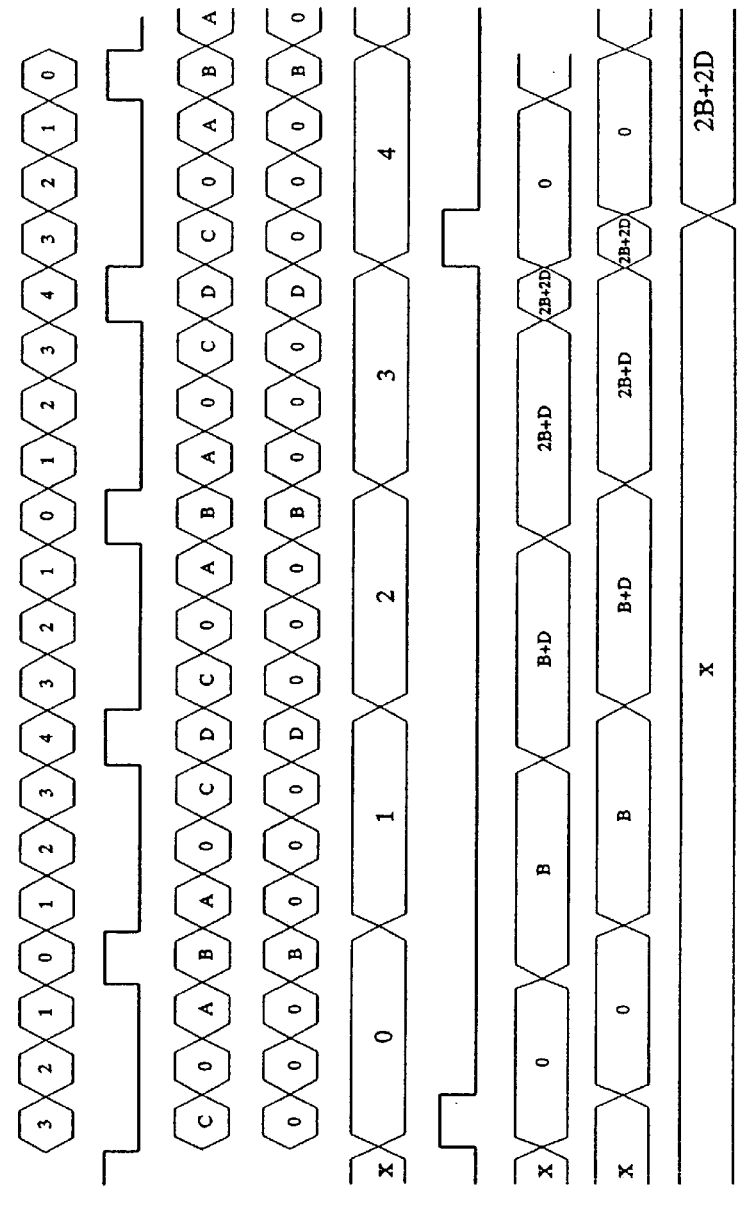

ADDITION RESULT FROM ADD₂ IS "0"

ADDITION RESULT FROM ADD₂ IS "4"

ADDITION RESULT FROM ADD₂ IS "0"

ADDITION RESULT FROM ADD₂ IS "4"

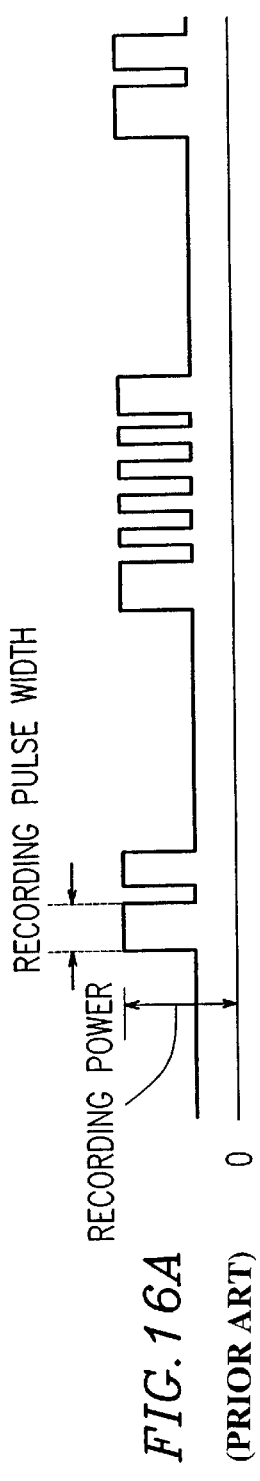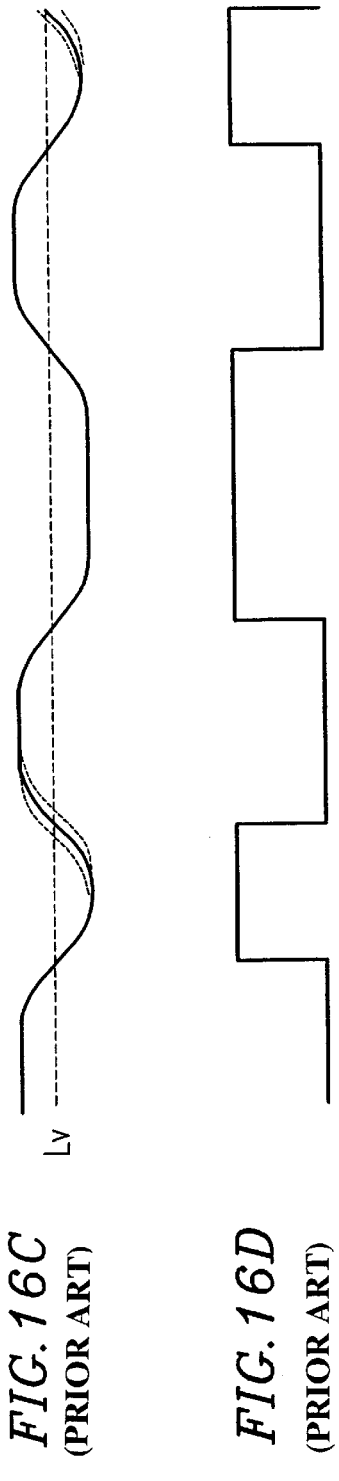
FIG. 16A (PRIOR ART)
FIG. 16B (PRIOR ART)
FIG. 16C (PRIOR ART)
FIG. 16D (PRIOR ART)

ASYMMETRY DETECTION APPARATUS, JITTER DETECTION APPARATUS, AND RECORDING/REPRODUCTION APPARATUS

FIELD OF THE INVENTION

The present invention relates to an apparatus for recording/reproducing digital information by using an information carrier, and more particularly to a technique for detecting jitter or asymmetry in a reproduced signal obtained from the information carrier.

BACKGROUND OF THE INVENTION

A type of recording/reproduction apparatus which is capable of recording/reproducing digital information onto/ from a removable recording medium is known in the prior art. An optical disk having a recording layer made of a phase change medium or a magneto-optical medium is widely used as the information carrier (or the recording medium).

For example, when digital information is recorded onto an optical disk having a phase change medium by using laser light, the optical disk is irradiated with laser light having a waveform as illustrated in FIG. 16A. As a result, marks are formed on the optical disk as illustrated in FIG. 16B, each having a length associated with the length of the corresponding piece of the recorded digital data. The marks recorded on the optical disk are read out by using laser light, thus producing a continuous analog signal as a reproduced signal, as illustrated in FIG. 16C. The reproduced analog signal is sliced at a predetermined level lv so as to be converted into a digital signal as illustrated in FIG. 16D, from which the original digital information is reproduced.

However, the shape of marks formed on the recording medium may vary due to the individual difference among different apparatuses or the individual difference among different recording media even if the digital information is recorded by using laser light of the same laser power and the same pulse waveform. A shift in the shape of a mark from the intended shape would result in a shift in the waveform of the reproduced analog signal and that of the converted digital signal from the intended waveforms, thereby degrading the quality of the reproduced signal. Thus, in the prior art, recording/reproduction apparatuses have a problem in that the quality of the reproduced signal from the recording medium may vary substantially for different apparatuses or recording media.

In order to prevent such degradation in reliability of the reproduced signal, the recording/reproduction apparatus performs a test recording operation or a calibration operation upon loading of the recording medium, for example. More specifically, the recording/reproduction apparatus records data having a known pattern in a predetermined area on the recording medium and reproduces the recorded data to measure the signal quality thereof. The recording/ reproduction apparatus optimizes the characteristics of the reproduction system or the parameters relating to the recording operation (recording parameters) based on the measured signal quality.

The quality of a reproduced signal is determined based on, for example, the error rate and the jitter (fluctuations of the reproduced signal along the time axis). The recording/ reproduction apparatus optimizes the characteristics of the reproduction system or the recording parameters so as to minimize the error rate and the jitter in the reproduced signal.

Particularly, in the case of a recording medium onto which information is recorded with heat by using laser light, or the like, heat interferences occur between adjacent recording patterns. As a result, the shape of a mark formed on the medium is likely to be different from the intended shape. When recording information onto such a recording medium, it is necessary to set the optimal recording parameters for the individual recording patterns.

The recording parameters include those varying in the direction of the time axis such as the recording pulse width and those varying in the direction of the reproduced signal amplitude such as the recording power as illustrated in FIG. 16A. Jitter can be used to evaluate those parameters which vary in the direction of the time axis of the recording pulse, whereas asymmetry in the reproduced signal can be used to evaluate those parameters which vary in the amplitude direction. When the recording power is not appropriate, there occurs asymmetry in the reproduced signal.

The structure of a conventional optical disk recording/ reproduction apparatus which calibrates the recording parameters by using jitter and asymmetry in a reproduced signal will now be described with reference to FIG. 12 to FIG. 14.

As illustrated in FIG. 12, reflected light from an optical disk 1 is converted by a photodiode, or the like, in a pickup portion of an optical head 2 into an electric signal, thus reproducing an analog signal which corresponds to digital information recorded on the optical disk 1. The obtained reproduced signal is subjected to a waveform shaping operation by a waveform equalizer 3. The waveform-shaped reproduced signal is sliced at a predetermined level Vc by a digitization circuit 4 which includes a comparator 15 (see FIG. 13), etc. Thus, the reproduced signal is converted into a continuous digital or binary signal.

The digital signal output from the digitization circuit 4 is input to a PLL (Phase Locked Loop) circuit including a phase comparator 5, an LPF (Low Pass Filter) 6 and a VCO (Voltage-Controlled Oscillator) 7, and a reproduction clock signal is produced in the PLL circuit. In the phase comparator 5, the input digital signal and a clock signal output from the VCO 7 are compared with each other, thus detecting a phase error therebetween. The detected phase error is averaged by the LPF 6 which includes a capacitor, and the like, so as to be converted into a voltage for driving the VCO 7. Thus, by varying the driving voltage for the VCO 7 according to the value of the phase error, a feedback control is performed on the oscillation frequency of the VCO 7 so that the phase error output from the phase comparator 5 approaches zero. In this way, it is possible to produce a reproduction clock signal which is in synchronization with the digital signal.

Even when a PLL circuit is used so that a reproduction clock signal in synchronization with the digital signal is output from the VCO 7, as described above, a phase error still occurs between the digital signal and the reproduction clock signal due to the length of the recorded mark differing from the ideal length. A jitter detection circuit 11 integrates absolute values of phase errors output from the phase comparator 5 for a predetermined period of time or for a predetermined number of zero-crossing points so as to calculate a jitter amount. The jitter amount is calculated for each of the individual recording patterns.

The calculated jitter amount is transferred to a recording parameter setting circuit 12. The recording parameter setting circuit 12 determines whether a recording parameter such as the recording pulse width is appropriate based on the jitter amount which is input thereto. When it is determined that the recording parameter is not appropriate, a more appropriate recording parameter is estimated and output to a recording compensation circuit 9.

The recording compensation circuit 9 converts a recording pattern obtained from a pattern generation circuit 8 into a pulse waveform by using the recording parameter output from the recording parameter setting circuit 12. A laser driving circuit 10 records digital information onto the optical disk 1 according to the obtained pulse waveform. Then, the recorded digital information is reproduced again to determine a jitter amount as described above. The recording/reproduction apparatus continues to optimize the recording parameter until it is determined that the jitter amount is less than or equal to a predetermined level in the recording parameter setting circuit 12.

Next, a case where the calibration operation is performed based on asymmetry in a reproduced signal will be described. FIG. 13 illustrates the structure of a conventional asymmetry detection section. FIG. 14 illustrates an example of a reproduced signal which has asymmetry.

As illustrated in FIG. 13, the asymmetry detection section includes an asymmetry detection circuit 17, a peak-side envelope voltage detection circuit 13 and a bottom-side envelope voltage detection circuit 14. The asymmetry detection circuit 17 receives the slice level (center voltage) Vc which is used in the comparator 15 of the digitization circuit 4 illustrated in FIG. 12.

Assume that a continuous recording pattern in which the mark/space duty ratio is 50% has been recorded in a test recording operation for the purpose of asymmetry detection, and a reproduced analog signal as illustrated in FIG. 14 has been obtained. The peak-side envelope voltage detection circuit 13 detects a peak-side envelope voltage Vp of the reproduced signal, and the bottom-side envelope voltage detection circuit 14 detects a bottom-side envelope voltage Vb of the reproduced signal. Each of the envelope voltage detection circuits 13 and 14 may be a sample hold circuit.

The reproduced signal is sliced at the center voltage Vc by the comparator 15 so as to be converted into a digital signal. The center voltage Vc is controlled by a feedback control using an integration circuit 16 which is connected to the output side of the comparator 15. This is for correcting fluctuations in the reproduced signal due to extrinsic factors (such as fluctuations in the reflectance of the medium, etc.) so that the duty ratio of the digital signal output from the comparator 15 is 50%, utilizing the fact that the recorded digital information stream is free of direct current components ("DC-free"). When the center voltage Vc is shifted to be higher than the appropriate level, the on-duty ratio of the output digital signal is less than 50%. When the center voltage Vc is shifted to be lower than the appropriate level, the on-duty ratio of the output digital signal is greater than 50%.

The integration circuit 16, which is provided for the duty ratio control, averages the output digital signal to produce the center voltage Vc. As a result of such a feedback control, the center voltage Vc is set to a level such that the duty ratio of the digital signal output from the comparator 15 is 50%.

As a result, the above-described center voltage Vc differs from the mean amplitude level of the reproduced signal as illustrated in FIG. 14. The asymmetry detection circuit 17 receives the peak-side envelope voltage Vp, the bottom-side envelope voltage Vb and the center voltage Vc, and calculates an asymmetry amount As based on these voltages as shown in the following expression:

$$As=(Vp+Vb)/2-Vc$$

The detected asymmetry amount As is transferred to the recording parameter setting circuit 12 illustrated in FIG. 12. The recording parameter setting circuit 12 adjusts the recording power based on the value of the asymmetry amount As. Thus, the recording/reproduction apparatus calibrates the recording power so that the asymmetry amount is within the intended range.

By performing such a test recording and appropriately selecting the recording parameter based on the jitter amount or the asymmetry amount obtained from the reproduced signal, it is possible to record information under conditions such that a reproduced signal of a better quality can be obtained irrespective of the individual difference among different apparatuses or recording media.

In recent years, the recording density of a recording medium is increasing significantly. One method for reproducing information which has been recorded with a high density is a PRML (Partial Response Maximum Likelihood) method which is a combination of the partial response equalization (hereinafter, referred to as "PR equalization") and the Viterbi decoding (see U.S. Pat. No. 5,719,843). FIG. 15 illustrates a signal processing circuit based on a typical PRML method.

As illustrated in the figure, the signal processing circuit includes: an AGC (Automatic Gain Control) circuit 18 for adjusting the signal amplitude of the reproduced signal to a predetermined value; a waveform equalizer 19 for removing unnecessary high-band noise components to emphasize the necessary signal band; an A/D (Analog-to-Digital) converter 20 for sampling the reproduced signal with a channel clock (sampling clock); a digital filter 21 for equalizing the sampled data so that the frequency characteristic of recorded/reproduced signal processing system coincides with a predetermined PR equalization; a Viterbi decoder 22 for outputting the most likely digitization result from discrete sampled data (i.e., the digitization result which is most probably correct based on the preceding data point and the following data point); a phase comparator 23 for detecting a phase error from the discrete sampled data; an LPF 24 for extracting the reproduction clock signal; a D/A (Digital-to-Analog) converter 25 for converting the digital value output from the LPF 24 into an analog value; and a VCO 26.

In the signal processing circuit described above, the original digital information is reproduced from sampled data of multiple levels which are obtained by sampling and quantizing an analog reproduced signal using the A/D converter 20. The sampling clock used in the A/D converter 20 is controlled by a feedback control which is performed by calculating a phase error from the sampled data using the phase comparator 23 and by controlling the oscillation frequency of the VCO 26 based on the phase error. In this way, sampled data is produced with a sampling clock which is in synchronization with the reproduced signal.

When using an optical disk recording/reproduction apparatus which is based on the PRML signal processing method as described above, it is preferred to detect asymmetry and jitter in the reproduced signal to optimize recording parameters used in a recording operation. However, when the conventional detection circuits as illustrated in FIG. 12 and FIG. 13 are employed for the recording/reproduction apparatus, the total circuit scale increases undesirably. The conventional asymmetry detection circuit illustrated in FIG. 13 employs the peak-side envelope voltage detection circuit 13 and the bottom-side envelope voltage detection circuit 14 to detect the envelope voltages. The conventional jitter detection circuit 11 illustrated in FIG. 12 detects a jitter amount by obtaining the average of the absolute values of phase error detection pulse widths from the phase comparator 5, and requires an analog PLL circuit therefor. Thus, such a recording/reproduction apparatus which includes both of an analog signal processing circuit for optimizing the recording parameters and a digital signal processing circuit for compliance with the PRML method has a problem that the total circuit scale increases unnecessarily.

SUMMARY OF THE INVENTION

It is therefore an object of this invention to provide an apparatus and method capable of detecting a jitter amount in a reproduced signal from a plurality of sampled data which are obtained by sampling the reproduced signal.

Another object of the present invention is to provide an apparatus and method capable of detecting an asymmetry amount in a reproduced signal from a plurality of sampled data which are obtained by sampling the reproduced signal.

Still another object of the present invention is to provide a recording/reproduction apparatus for optimizing recording parameters by using such detection apparatuses.

An inventive apparatus of the present invention is an asymmetry detection apparatus for detecting asymmetry in a reproduced signal which is obtained by reproducing digital information recorded on an information carrier, the asymmetry detection apparatus including: a clock signal generator for generating a clock signal based on the reproduced signal; an A/D converter for sampling the reproduced signal in synchronization with the clock signal; a determiner for determining whether a level of each of a plurality of sampled data obtained by the sampling operation is equal to or greater than a predetermined level; and a detector for selecting predetermined ones of the plurality of sampled data based on an output from the determiner so as to detect asymmetry in the reproduced signal by using the selected determined ones of the plurality of sampled data.

In one embodiment of the present invention, the detector selects one of the plurality of sampled data which has a maximum value and another one of the plurality of sampled data which has a minimum value based on the output from the determiner.

In another embodiment, the detector detects asymmetry in the reproduced signal by accumulating the sampled data which has the maximum value and the sampled data which has the minimum value.

In still another embodiment, the determiner obtains polarity information of the sampled data, and the detector identifies one of the plurality of sampled data which has the maximum value and another one of the plurality of sampled data which has the minimum value based on the polarity.

In still another embodiment, the clock signal generator detects a phase error between the reproduced signal and the clock signal by using the sampled data so as to perform a feedback control on the clock signal based on the detected phase error.

Another inventive apparatus of the present invention is a recording/reproduction apparatus including: an asymmetry detection apparatus as described above; a recording parameter setting section for setting a recording parameter based on the asymmetry in the reproduced signal detected by the asymmetry detection apparatus; and a recording apparatus for recording digital information on the information carrier by using the recording parameter.

Still another inventive apparatus of the present invention is a jitter detection apparatus for detecting jitter in a reproduced signal which is obtained by reproducing digital information recorded on an information carrier, the jitter detection apparatus including: a clock signal generator for generating a clock signal based on the reproduced signal; an A/D converter for sampling the reproduced signal in synchronization with the clock signal; a determiner for determining whether a level of each of a plurality of sampled data obtained by the sampling operation is equal to or greater than a predetermined level; and a detector for detecting jitter in the reproduced signal by using predetermined ones of the plurality of sampled data based on an output from the determiner.

In one embodiment of the present invention, the determiner obtains polarity information of the sampled data.

In another embodiment, the detector detects jitter in the reproduced signal by using the sampled data substantially at a point where the polarity of the sampled data is reversed from one to another.

In still another embodiment, the detector accumulates absolute values of phase errors of the predetermined ones of the sampled data.

In still another embodiment, a signal pattern which is formed by the plurality of sampled data is detected based on the output from the determiner.

In still another embodiment, jitter for a predetermined pattern is detected by detecting the jitter when it is determined that the signal pattern is equal to the predetermined pattern.

Still another inventive apparatus of the present invention is a recording/reproduction apparatus, including: a jitter detection apparatus as described above; a recording parameter setting section for setting a recording parameter based on the jitter in the reproduced signal detected by the jitter detection apparatus; and a recording apparatus for recording digital information on the information carrier by using the recording parameter.

An inventive method of the present invention is a method for detecting asymmetry in a reproduced signal which is obtained by reproducing digital information recorded on an information carrier, the asymmetry detection method including the steps of: generating a clock signal based on the reproduced signal; sampling the reproduced signal in synchronization with the clock signal; and detecting asymmetry in the reproduced signal by accumulating selected ones of a plurality of sampled data obtained by the sampling operation.

Another inventive method of the present invention is a method for detecting jitter in a reproduced signal which is obtained by reproducing digital information recorded on an information carrier, the jitter detection method including the steps of: generating a clock signal based on the reproduced signal; sampling the reproduced signal in synchronization with the clock signal; and detecting jitter in the reproduced signal by accumulating selected ones of a plurality of sampled data obtained by the sampling operation.

Still another inventive method of the present invention is an asymmetry detection method, including the steps of: obtaining equalized outputs of multiple levels through a partial response equalization operation of a reproduced signal from an information carrier; and detecting asymmetry in the reproduced signal by accumulating one of the equalized outputs which has a maximum value and another one of the equalized outputs which has a minimum value.

BRIEF DESCRIPTION OF THE DRAWINGS

FIG. 6A to FIG. 6I are state transition diagrams for signals/information used in the phase comparison process block in the disk recording/reproduction apparatus according to the embodiment of the present invention;

FIG. 8A to FIG. 8U are state transition diagrams for signals/information used in the phase comparison process block and the asymmetry detection process block in the disk recording/reproduction apparatus according to the embodiment of the present invention;

FIG. 16A to FIG. 16D illustrate the general principle of recording/reproducing digital data onto/from an optical medium.

DESCRIPTION OF THE PREFERRED EMBODIMENTS

Preferred embodiments of the present invention will now be described with reference to the figures.

Figure 1:
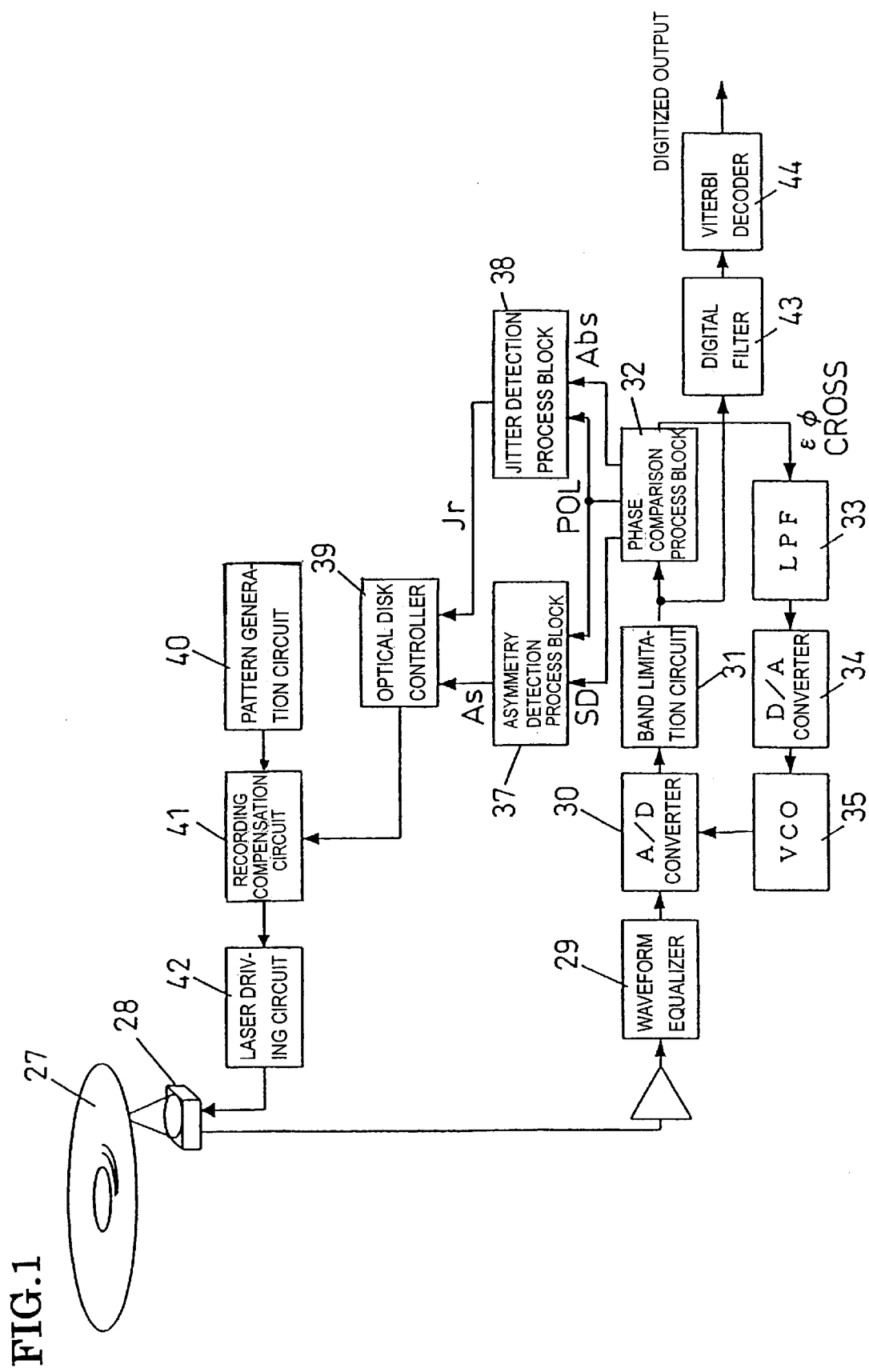
FIG. 1 is a block diagram illustrating a disk recording/reproduction apparatus according to one embodiment of the present invention.

FIG. 1 is a block diagram illustrating an optical disk recording/reproduction apparatus according to one embodiment of the present invention. A test recording operation using the illustrated recording/reproduction apparatus will now be described.

In the test recording, an optical disk controller 39 outputs prestored recording parameters to a recording compensation circuit 41, and a pattern generation circuit 40 outputs a predetermined recording pattern to the recording compensation circuit 41. The recording compensation circuit 41 uses the recording pattern and the recording parameters input thereto to produce a laser emission control pulse waveform corresponding to the recording pattern. According to the laser emission control pulse waveform, a laser driving circuit 42 drives an optical head 28 to record digital information onto an optical disk 27.

Then, in order to check whether the recording conditions are good, the digital information recorded on the optical disk 27 is reproduced.

First, the optical head 28 is used to irradiate the optical disk 27 with reproduction laser light. The reflected light from the optical disk 27 is converted into an electric signal in the pickup portion of the optical head 28 by using a photodiode, or the like, thus producing an analog reproduced signal. The reproduced signal is amplified and then subjected to a waveform shaping operation by a waveform equalizer 29. The waveform-shaped reproduced signal is sampled and quantized in an A/D converter 30 which uses, for example, a plurality of comparators, thus obtaining sampled data having multiple levels. The sampled data is output from the A/D converter 30 as a digital signal. The sampling frequency used in the A/D converter 30 is determined based on the output from a VCO 35.

A band limitation circuit 31 removes an unnecessary low frequency component which may be contained in the quantized reproduced signal (sampled data). The band-limited sampled data is output to a phase comparison process block 32 and a digital filter 43.

The phase comparison process block 32 uses the input signal to detect a phase error between the reproduced signal and the clock signal (i.e., the output from the VCO 35). The method for detecting the phase error will be described later. An LPF 33 determines the frequency component which the VCO 35 should follow based on the detected phase error. The signal output from the LPF 33 is converted into an analog signal by a D/A converter 34 to be used as a control voltage for the VCO 35. As can be seen, in the present embodiment, a PLL circuit is formed by the phase comparison process block 32 and the LPF 33, which perform digital signal processing, the D/A converter 34, and the VCO 35. The PLL circuit performs a feedback control on the oscillation frequency of the VCO 35 so that the value of the phase error approaches zero. Thus, a clock signal in synchronization with the reproduced signal is produced.

The digital filter 43 performs a waveform shaping operation on the output from the band limitation circuit 31 so that the frequency characteristic of recorded/reproduced signal processing system coincides with a predetermined PR equalization. The equalized output from the digital filter 43 is decoded by a Viterbi decoder 44 so as to produce the most likely digitized output. The digitized output is transferred to the digital signal processing circuit in the following stage via the optical disk controller 39. An error correction operation, etc., are performed in the digital signal processing circuit, thus obtaining an intended reproduced data.

The recording/reproduction apparatus of the present embodiment is provided with an asymmetry detection process block 37 and a jitter detection process block 38 for detecting asymmetry and jitter, respectively, in the reproduced signal based on the output from the phase comparison process block 32.

The asymmetry detection process block 37 receives discrete sampled data SD of multiple values produced by the A/D converter 30 via the band limitation circuit 31 and the phase comparison process block 32. The asymmetry detection process block 37 also receives polarity determination information POL for the sampled data SD. The asymmetry detection process block 37 calculates digital asymmetry information As using the sampled data SD selected based on the polarity determination information POL. The digital asymmetry information As is transferred to the optical disk controller 39.

The jitter detection process block 38 receives a phase error absolute value Abs and the polarity determination information POL detected by the phase comparison process block 32. The jitter detection process block 38 detects a signal pattern indicated by the sampled data SD from the polarity determination information POL, and calculates digital jitter information Jr by using the phase error absolute value Abs for the sampled data SD. The digital jitter information Jr is also transferred to the optical disk controller 39.

The optical disk controller 39 determines whether each of the recording parameters such as the recording power and the recording pulse width is appropriate based on the digital asymmetry information As from the asymmetry detection process block 37 and the digital jitter information Jr from the jitter detection process block 38. If it is determined from the digital asymmetry information As or the digital jitter information Jr that any of the prestored recording parameters is not appropriate, the optical disk controller 39 estimates a more appropriate value for that recording parameter to set the new recording parameter in the recording compensation circuit 41. A test recording operation is performed again using the updated recording parameters. The recording/reproduction apparatus repeats the test recording operation until it is determined that all of the recording parameters are appropriate, thereby optimizing the recording parameters.

The structures of the asymmetry detection process block 37 and the jitter detection process block 38 will now be described in greater detail with reference to FIG. 2.

The asymmetry detection process block 37 includes multi-level determination means 50 and asymmetry calculation means 60. The multi-level determination means 50 performs a multi-level determination for the sampled data SD transferred from the A/D converter 30 via the band limitation circuit 31 and the phase comparison process block 32. The asymmetry calculation means 60 calculates the digital asymmetry information As based on an asymmetry information calculation enable instruction Ea which is issued depending upon the determination result obtained by the multi-level determination means 50.

The multi-level determination means 50 include sample polarity determination means 52 and peak value detection means 54. The sample polarity determination means 52 determines the polarity of the sampled data SD to output the polarity determination information POL. The peak value detection means 54 detects (or identifies) one of the sampled data SD which has the maximum value (the maximum sampled data $SD_{max}$) and one of the sampled data SD which has the minimum value (the minimum sampled data $SD_{min}$) based on the polarity determination information POL. The peak value detection means 54 of the multi-level determination means 50 outputs the asymmetry information calculation enable instruction Ea upon detection of the maximum sampled data $SD_{max}$ or the minimum sampled data $SD_{min}$.

The asymmetry calculation means 60 calculates the digital asymmetry information As by accumulating the sampled data SD when the enable instruction Ea is input from the peak value detection means 54.

Figure 14:
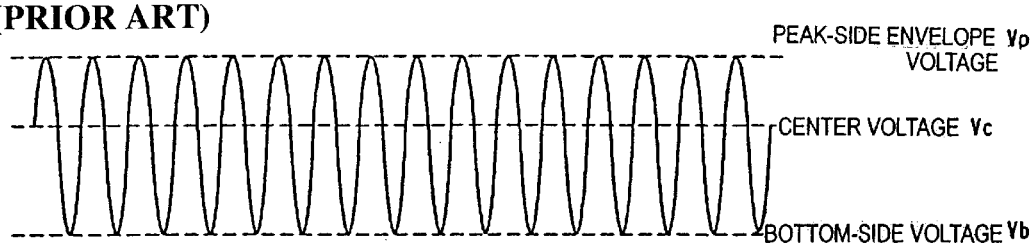
FIG. 14 illustrates an example of a reproduced signal which has asymmetry.
Figure 15:
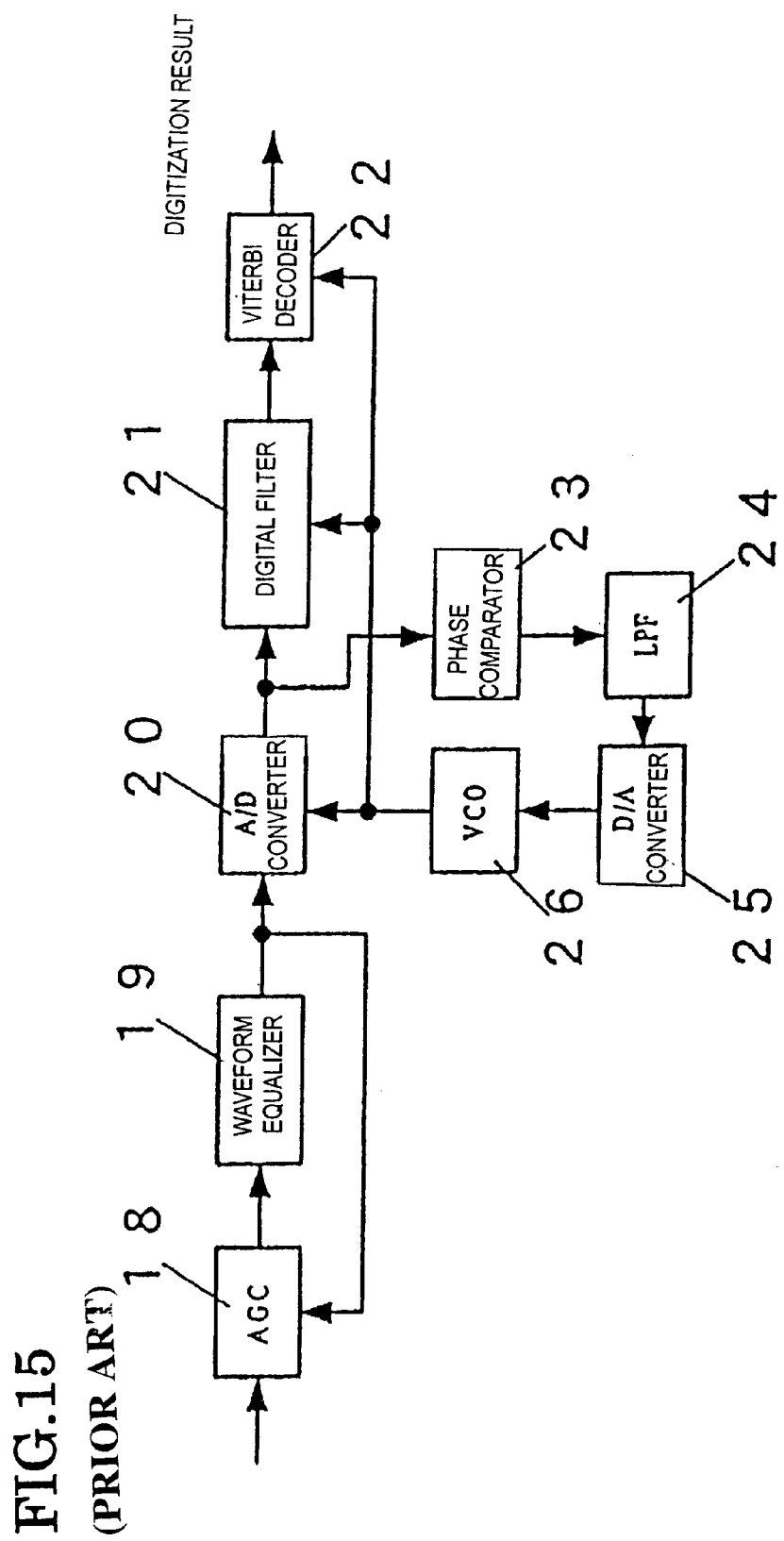
FIG. 15 is a schematic diagram illustrating a signal processing circuit based on a typical PRML (Partial Response Maximum Likelihood) method.

The asymmetry detection process block 37 having such a structure selectively accumulates the maximum sampled data $SD_{max}$ and the minimum sampled data $SD_{min}$ among all the sampled data SD so as to detect the asymmetry amount in the reproduced signal based on the accumulation result. In this way, the asymmetry amount, which is conventionally calculated by using an analog circuit, can be digitally detected. This is because if a reproduced signal has asymmetry, the asymmetry amount is reflected in the sampled values since the sampled data SD are obtained by sampling the reproduced signal with a clock which is produced by using the PLL circuit. For example, if a reproduced signal as illustrated in FIG. 14 is sampled with a clock in synchronization with the reproduced signal, sampled data having a value corresponding to the center voltage Vc (the reference sampled data), sampled data having a value corresponding to the peak-side envelope voltage Vp (the maximum sampled data $SD_{max}$), and sampled data having a value corresponding to the bottom-side envelope voltage Vb (the minimum sampled data $SD_{min}$) are alternately produced. In the case where the value of the reference sampled data is ideally zero, the maximum sampled data $SD_{max}$ and the minimum sampled data $SD_{min}$ are detected as being a positive value and a negative value, respectively, of different absolute values. The difference between the absolute values of the sampled data has a value associated with the asymmetry amount in the reproduced signal. Thus, it is possible to calculate the asymmetry amount as in the prior art by accumulating the maximum sampled data $SD_{max}$ and the minimum sampled data $SD_{min}$ of the sampled data.

The jitter detection process block 38 includes phase error absolute value production means 70, the sample polarity determination means 52 which is also used in the multi-level determination means 50, recording pattern extraction means 80, pattern determination means 85, and jitter calculation means 90. The phase error absolute value production means 70 produces the phase error absolute value Abs between the reproduced signal and the sampling clock by using the sampled data SD. The recording pattern extraction means 80 extracts a recording pattern KP of the sampled data SD based on the polarity determination information POL from the sample polarity determination means 52. The pattern determination means 85 compares the extracted recording pattern KP with a reference pattern KPth so as to output a jitter information calculation enable instruction Ej when the extracted recording pattern KP and the reference pattern KPth are equal to each other. The jitter calculation means 90 calculates the digital jitter information Jr by accumulating the phase error absolute values Abs from the phase error absolute value production means 70 when the jitter information calculation enable instruction Ej is input thereto.

In the jitter detection process block 38 having such a structure, a recording pattern is determined using the polarity determination information POL, and the jitter amount for the recording pattern is calculated from the phase error absolute value Abs of selected sampled data. In this way, jitter amounts for different recording patterns can be calculated separately, whereby it is possible to set an appropriate recording parameter for each of the recording patterns.

Figure 2:
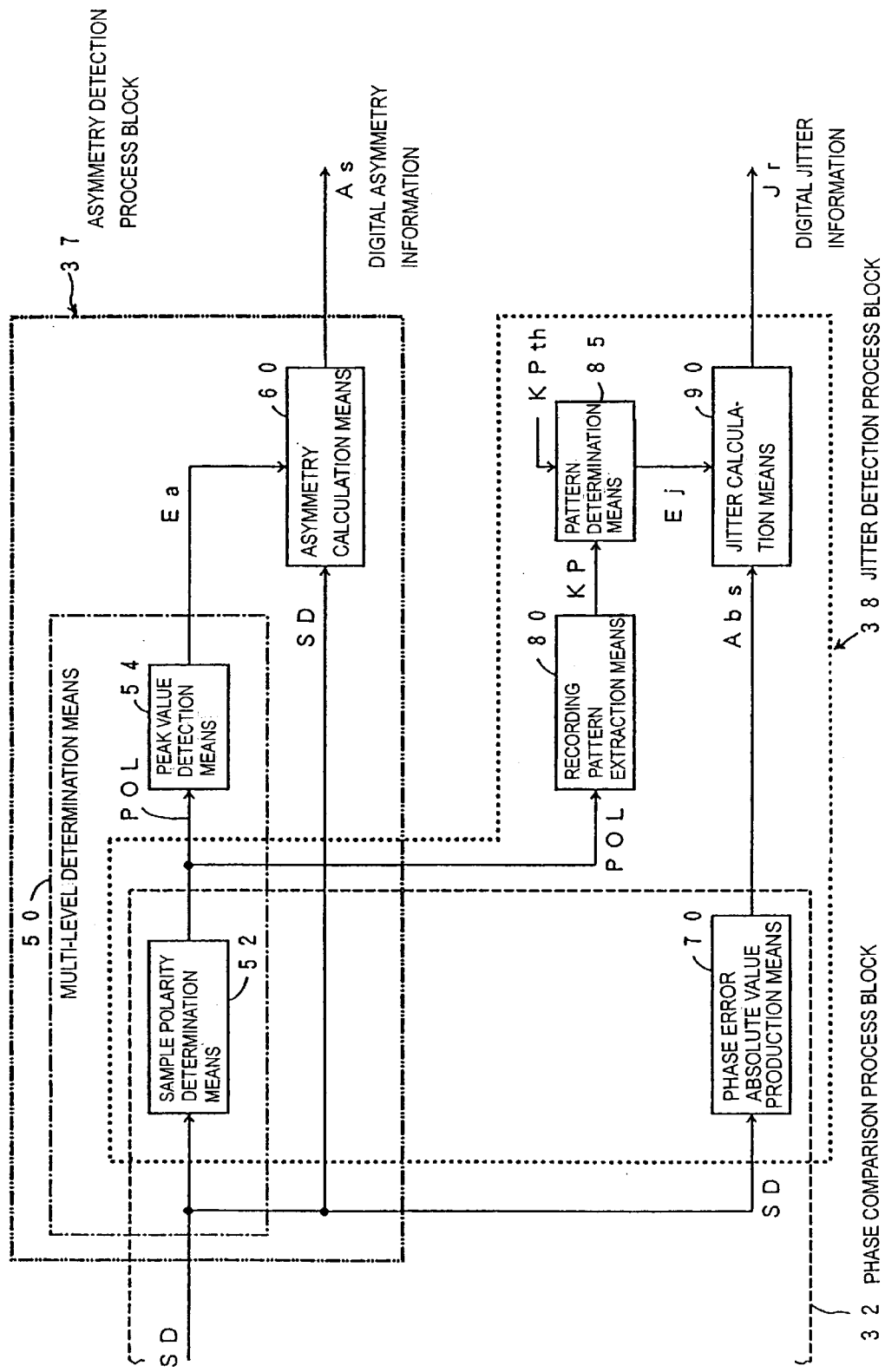
FIG. 2 is a block diagram illustrating an asymmetry detection process block and a jitter detection process block in the disk recording/reproduction apparatus illustrated in FIG. 1.

As illustrated in FIG. 2, in the present embodiment, the sample polarity determination means 52 and the phase error absolute value production means 70 include circuits provided in the phase comparison process block 32. Note that the present invention is not limited to such a structure.

Next, the circuit structures of the phase comparison process block 32, the asymmetry detection process block 37 and the jitter detection process block 38 will be described in greater detail. In the following description, a PR (a, b, b, a) equalization (where a and b are each an arbitrary positive constant) is used as a PR equalization method, and an 8–16 modulation is used as a recording code modulation method. The details of a signal reproduction method using a PR equalization are described in, for example, U.S. Pat. No. 5,719,843.

In a PR (a, b, b, a) equalization, a reproduced signal is subjected to a waveform shaping operation so that the frequency characteristic of the recorded/reproduced signal processing system, including the recording medium such as the optical disk 27, coincides with a predetermined PR (a, b, b, a) equalization. Then, the sampled data SD output from the band limitation circuit 31 ideally takes the following five values: "0", "a", "a+b", "a+2b" and "2a+2b". In order to facilitate the understanding, it is assumed that "a+b" is used as a reference so that the sampled data SD takes the following five values: "−a−b", "−b", "0", "b" and "a+b".

Figure 3:
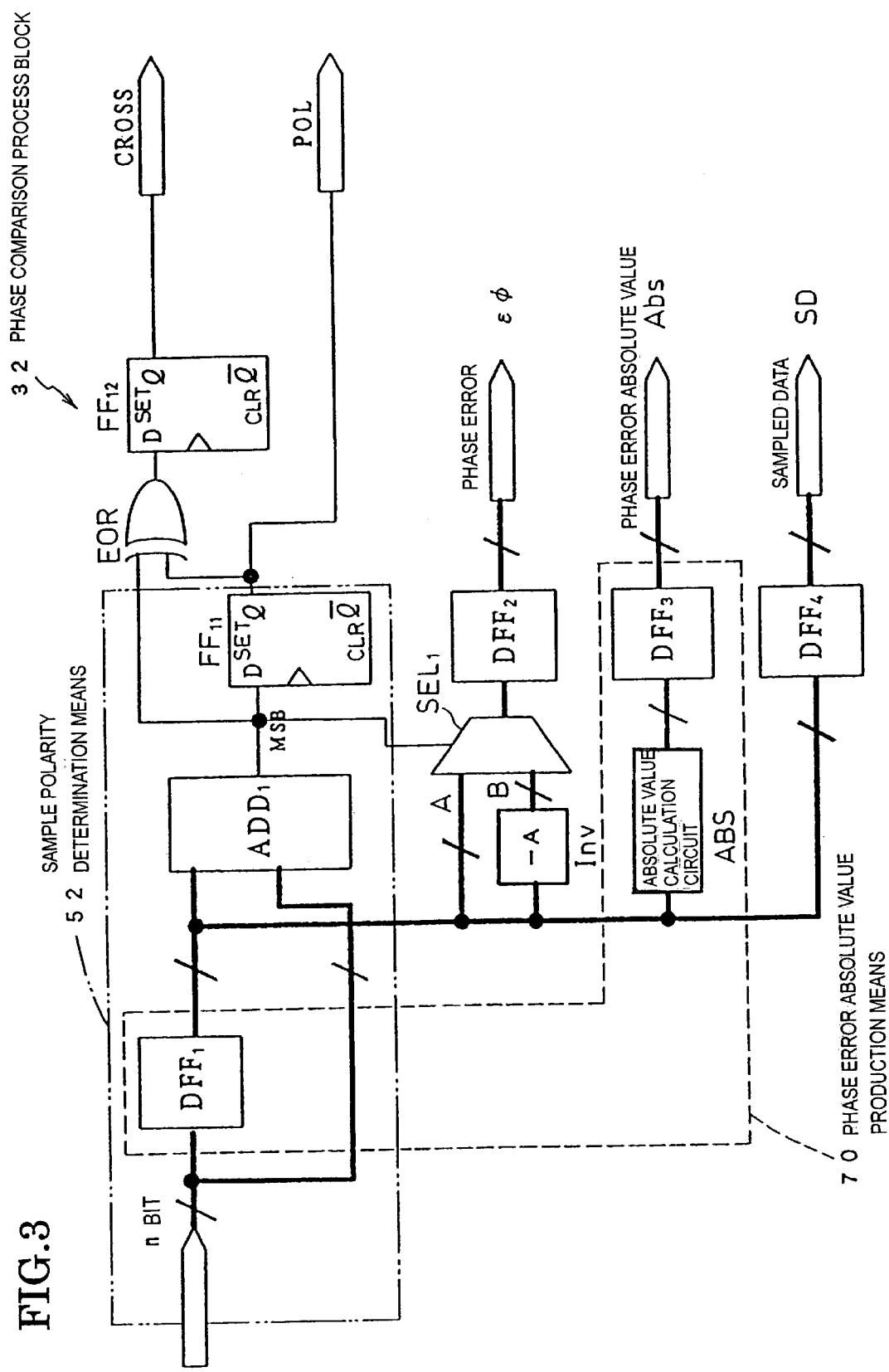
FIG. 3 is a circuit diagram illustrating a phase comparison process block in the disk recording/reproduction apparatus illustrated in FIG. 1.
Figure 4:
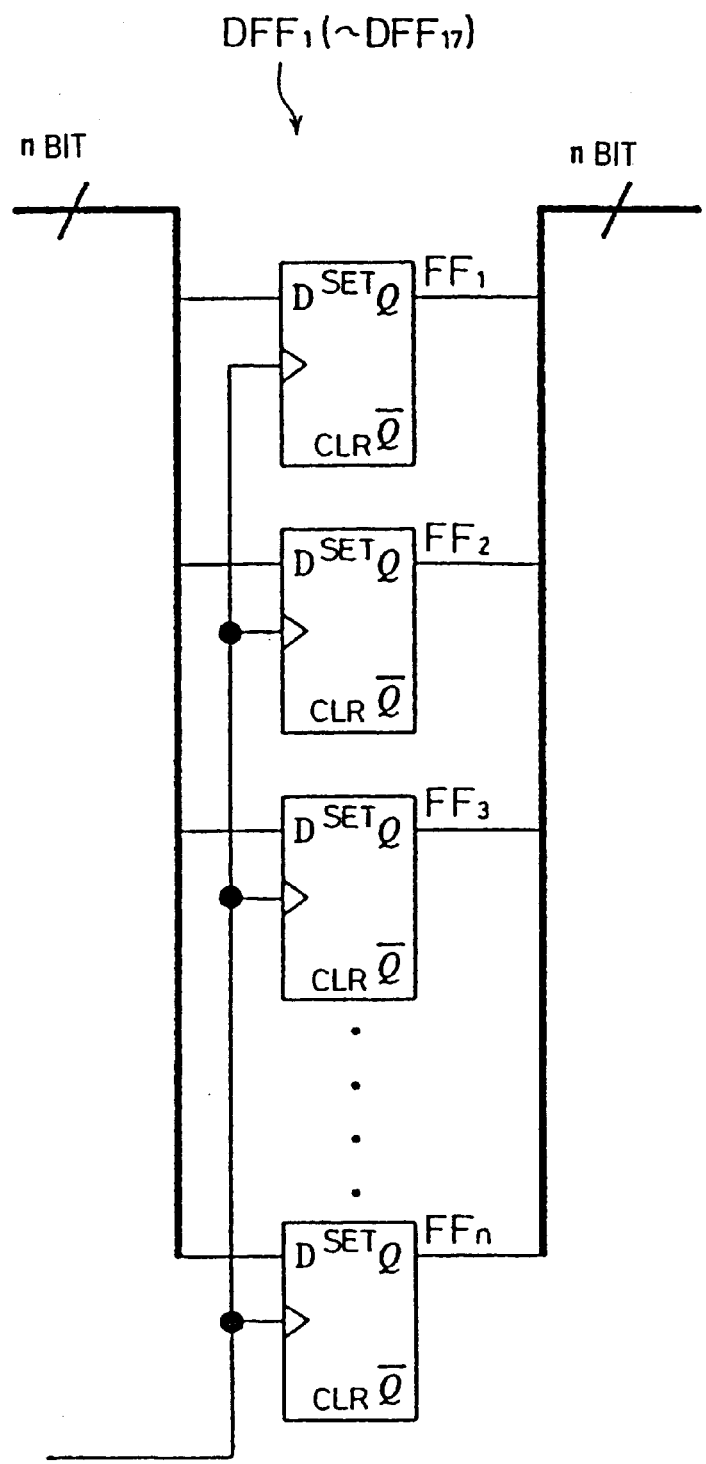
FIG. 4 is a circuit diagram illustrating an n-bit parallel flip flop circuit illustrated in FIG. 3.
Figure 5:
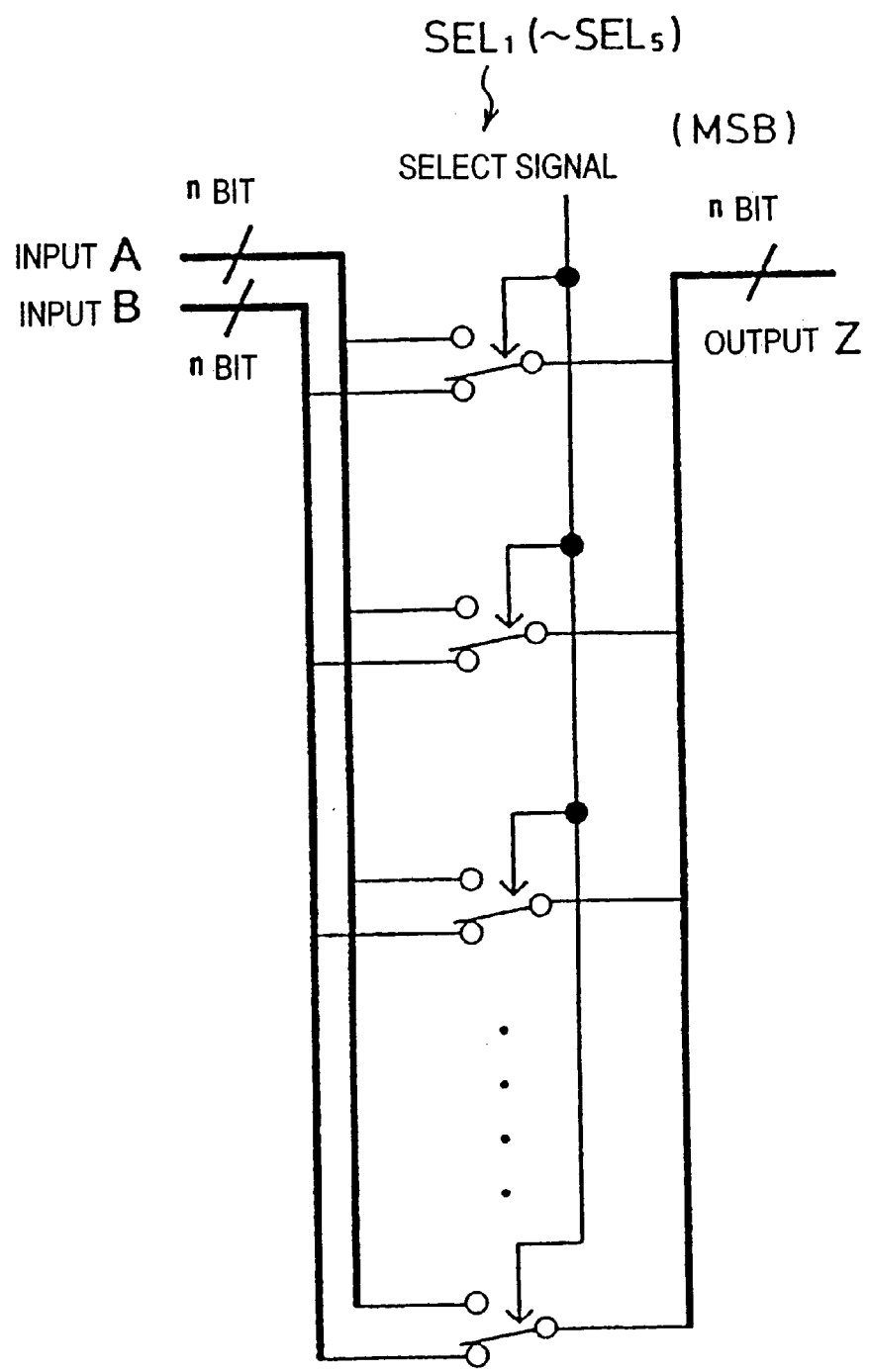
FIG. 5 is a circuit diagram illustrating a selector illustrated in FIG. 3.

FIG. 3 is a circuit diagram illustrating a detailed logic circuit structure of the phase comparison process block 32, FIG. 4 is a circuit diagram illustrating a detailed logic circuit structure of an n-bit parallel flip flop circuit $DFF_1$ illustrated in FIG. 3, FIG. 5 is a circuit diagram illustrating a detailed logic circuit structure of a selector $SEL_1$ illustrated in FIG. 3, and FIG. 6A to FIG. 6I are state transition diagrams for signals/information used in the phase comparison process block 32.

When a reproduced signal having a waveform as illustrated in FIG. 6A is input from the optical disk 27 to the A/D converter 30, the reproduced signal is sampled based on a clock signal as illustrated in FIG. 6B, and quantized as illustrated in FIG. 6C. The quantized data at a point in time takes one of the five values: "0", "b", "a+b", "−b" and "−a−b". Since a sine wave is used herein as an example of a reproduced signal, the quantized data is a repetition of a sequence: "0", "b", "a+b", "b", "0", "−b", "−a−b", "−b".

The multi-level determination means 50 determines which one of the five values is being taken by the sampled data SD, and outputs the determination result as the enable instruction Ea to the asymmetry calculation means 60.

The phase comparison process block 32 illustrated in FIG. 3 includes n-bit data type (delayed type) flip flop circuits $DFF_1$ to $DFF_4$, an addition circuit $ADD_1$, single-bit data type (delayed type) flip flop circuits $FF_{11}$ and $FF_{12}$, an exclusive OR circuit EOR, an inversion circuit Inv, an absolute value calculation circuit ABS, and a selector $SEL_1$.

As illustrated in FIG. 4, each of the n-bit parallel flip flop circuits $DFF_1$ to $DFF_4$ includes n single-bit data type (delayed type) flip flops $FF_1$ to $FF_n$ which are connected in parallel to one another. When the flip flop circuit $DFF_1$ receives a signal as illustrated in FIG. 6C, the flip flop circuit $DFF_1$ outputs a signal delayed by one clock as illustrated in FIG. 6D.

The addition circuit $ADD_1$ receives n-bit sampled data SD, and also receives a delayed version of the sampled data SD which has been delayed by one clock through the flip flop circuit $DFF_1$. The addition circuit $ADD_1$ adds the received signals together and outputs the MSB (Most Significant Bit) of the addition result. With the ideal PR (a, b, b, a) equalization, the addition result from the addition circuit $ADD_1$ takes the following four values: "−a−2b", "−b", "b" and "a+2b" since 0+b=b, b+(a+b)=a+2b, (a+b)+b=a+2b, b+0=b, 0+(−b)=−b, (−b)+(−a−b)=−a−2b, (−a−b)+(−b)=−a−2b, and (−b)+0=−b. Again, the addition circuit $ADD_1$ outputs the MSB of the addition result.

The MSB output from the addition circuit $ADD_1$ indicates whether the average value of adjacent sampled data SD is equal to or greater than the reference value ("0" in this example) or less than the reference value. Based on the output MSB, the polarity determination information POL indicating the polarity of the sampled data SD as illustrated in FIG. 6E is obtained. The polarity determination information POL corresponds to the recorded digital information.

Figure 11:
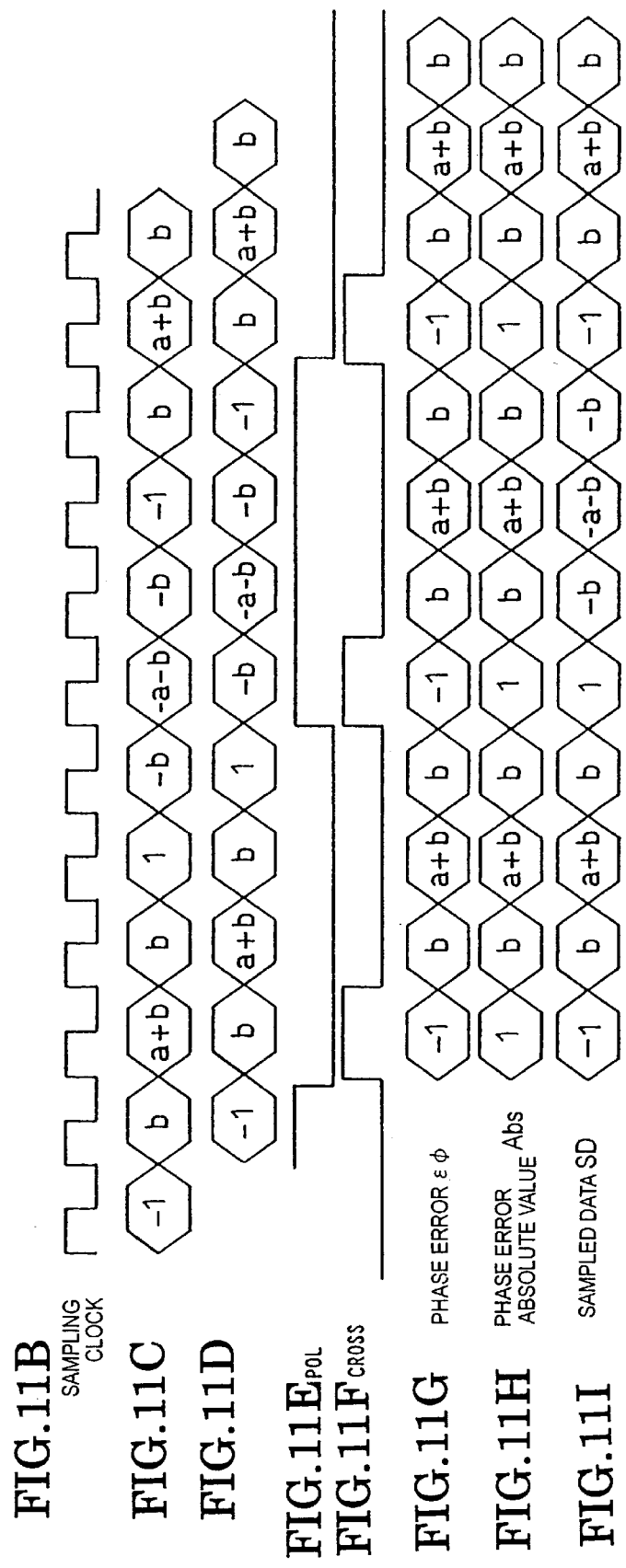
FIG. 11A to FIG. 11I are state transition diagrams for signals/information used in the phase comparison block which are different from those of FIG. 6A to FIG. 6I.
Figure 12:
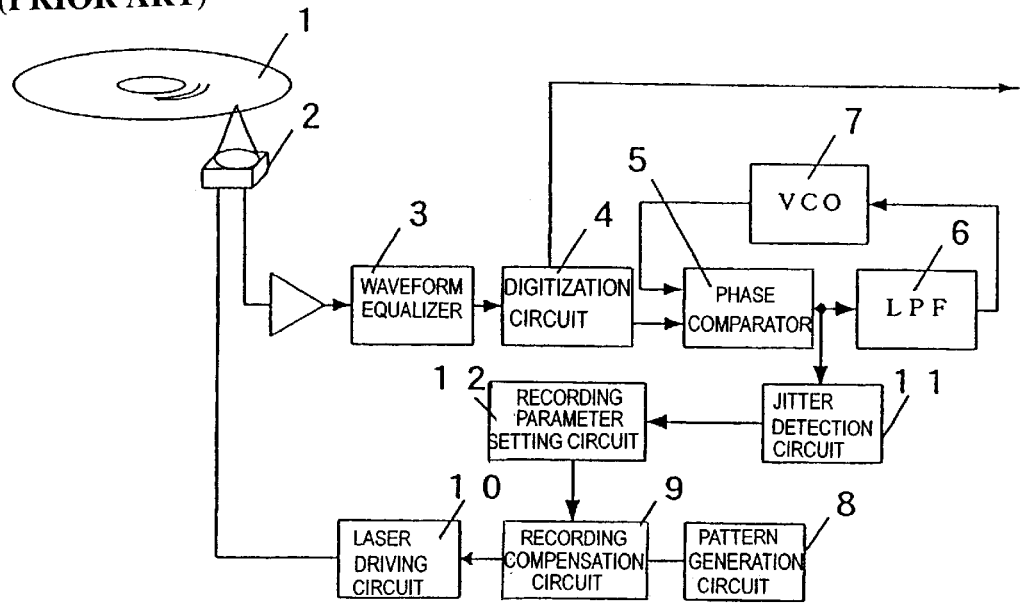
FIG. 12 is a block diagram illustrating a conventional disk recording/reproduction apparatus.
Figure 13:
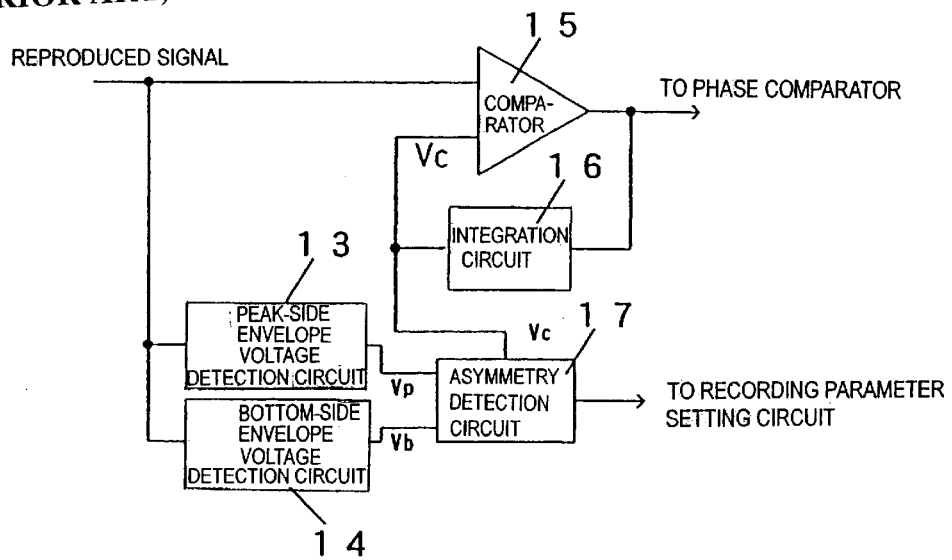
FIG. 13 illustrates a conventional asymmetry detection circuit.

The MSB of an addition result is used for producing the polarity determination information POL so as to ensure that the polarity determination information POL corresponding to the recorded digital information is obtained even when sampled data which should ideally take the value "0" actually takes a slightly shifted value such as "−1" or "1", as illustrated in FIG. 11A, due to the influence of jitter, or the like. FIGS. 11A to 11I correspond to FIGS. 6A to 6I respectively, and illustrate state transition diagrams for signals/information when the channel clock (sampling clock) signal is advanced with respect to the input reproduced signal.

Thus, the polarity determination information POL produced in the sample polarity determination means 52 including the n-bit parallel flip flop circuit $DFF_1$, the addition circuit $ADD_1$ and the flip flop $FF_{11}$ is output to the peak value detection means 54 in the asymmetry detection process block 37 and the recording pattern extraction means 80 in the jitter detection process block 38. Note that in the present embodiment, the polarity determination information POL is output via the flip flop $FF_{11}$ which is provided as a delay element for the purpose of timing adjustment. The delayed polarity determination information POL is illustrated in FIG. 6E.

A transition of the MSB of an addition result from the addition circuit $ADD_1$ from "L" to "H" or from "H" to "L" indicates that the reproduced signal is crossing a point of the value "0". At such a timing, a zero crossing point is detected. The exclusive OR circuit EOR is used to obtain the exclusive OR value between the MSB and the delayed version of the MSB which has been delayed by one clock through the flip flop $FF_{11}$. The output from the exclusive OR circuit EOR is "H" only when these values are "H" and "L", respectively, or "L" and "H", respectively. Thus, the exclusive OR circuit EOR outputs a zero crossing point detection signal CROSS as illustrated in FIG. 6F whose "H" level corresponds to a zero crossing point of the reproduced signal. The zero crossing point detection signal CROSS is output to the gate of the LPF 33. Note that in the present embodiment, the zero crossing point detection signal CROSS is output to the LPF 33 via the flip flop $FF_{12}$ which is provided as a delay element for the purpose of timing adjustment.

Next, the method for detecting a phase error will be described. FIG. 5 illustrates a detailed circuit structure of the selector $SEL_1$ which is provided for the purpose of detecting a phase error. The selector $SEL_1$ receives n-bit sampled data A which is output from the n-bit parallel flip flop circuit $DFF_1$, and sampled data B which is the sampled data A having been inverted by the inversion circuit Inv. The selector $SEL_1$ selectively outputs the sampled data A or the sampled data B based on the value of the MSB using the MSB output from the addition circuit $ADD_1$ as a select signal. As a result, the selector $SEL_1$ outputs a phase error $\epsilon\phi$ as illustrated in FIG. 6G. Note that in the present embodiment, the phase error $\epsilon\phi$ is output to the LPF 33 via the n-bit parallel flip flop circuit $DFF_2$ which is provided as a delay element for the purpose of timing adjustment.

When there is a phase error, the sampled data SD corresponding to the zero crossing point has a value other than "0" depending upon the level of the phase error. Such sampled data SD need to be processed by using an inversion circuit as described above so that the sampled data SD have the same polarity. For example, when the channel clock (sampling clock) is advanced with respect to the input signal as illustrated in FIG. 11A to FIG. 11I, the sampled data SD when the zero crossing point detection signal CROSS is "H" alternately takes a negative value ("−1") and a positive value ("1"). On the contrary, the phase error εφ produced by using the inversion circuit always takes a negative value ("−1"). The produced phase error εφ is input to the LPF 33 and is converted via the D/A converter 34 to a control voltage for the VCO 35.

As shown in FIG. 3, the output from the n-bit parallel flip flop circuit $DFF_1$ (data obtained by delaying the sampled data SD by one clock) is input to the absolute value calculation circuit ABS. The absolute value calculation circuit ABS takes the absolute value of each sampled data SD, and outputs the obtained absolute value to the jitter calculation means 90 in the jitter detection process block 38 as the phase error absolute value Abs via the n-bit parallel flip flop circuit $DFF_3$ which is provided as a delay element for the purpose of timing adjustment. The phase error absolute value Abs is as illustrated in FIG. 6H. Thus, the n-bit parallel flip flop circuit $DFF_1$, the absolute value calculation circuit ABS and the n-bit parallel flip flop circuit $DFF_3$ in the phase comparison process block 32 together form the phase error absolute value production means 70.

A delayed version of each sampled data SD which has been delayed by two clocks through the n-bit parallel flip flop circuits $DFF_1$ and $DFF_2$ is output from the phase comparison process block 32. FIG. 6I illustrates the two-clock delayed version of the sampled data SD. The obtained sampled data SD is input to the asymmetry calculation means 60 in the asymmetry detection process block 37.

Figure 7:
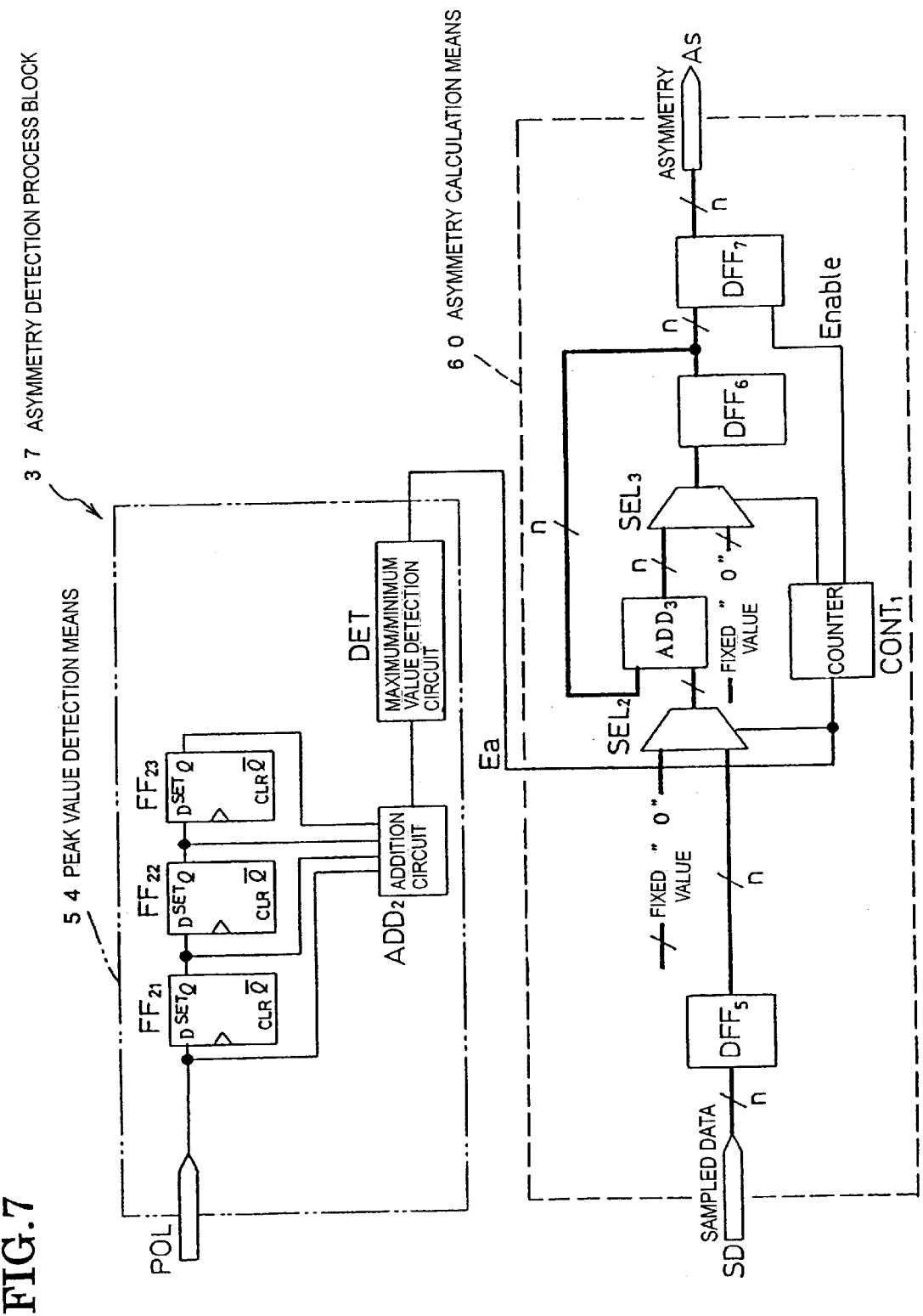
FIG. 7 is a circuit diagram illustrating peak value detection means and asymmetry calculation means in the asymmetry detection process block illustrated in FIG. 2.

FIG. 7 is a circuit diagram illustrating detailed logic circuit structures of the peak value detection means 54 and the asymmetry calculation means 60 in the asymmetry detection process block 37. FIG. 8A to FIG. 8U illustrate various signals which are processed in the asymmetry detection process block 37 as will be described below. FIG. 8A to FIG. 8I are similar to FIG. 6A to FIG. 6I, except that the sampled values "0", "b", "a+b", "−b" and "−a−b" used in FIG. 6A to FIG. 6I are respectively denoted by "0", "A", "B", "C" and "D" in FIG. 8A to FIG. 8I.

The peak value detection means 54 includes flip flops $FF_{21}$, $FF_{22}$ and $FF_{23}$, an addition circuit $ADD_2$, and a maximum/minimum value detection circuit DET. The flip flop $FF_{21}$ delays the polarity determination information POL which is input from the sample polarity determination means 52 by one clock as illustrated in FIG. 8J. The flip flop $FF_{22}$ delays the polarity determination information POL which has been delayed by the flip flop $FF_{21}$ further by one clock as illustrated in FIG. 8K, and the flip flop $FF_{23}$ delays the polarity determination information POL which has been delayed by the flip flop $FF_{22}$ further by one clock as illustrated in FIG. 8L. The four signals each being shifted from the adjacent signal by one clock are added together by the addition circuit $ADD_2$. When the input to the addition circuit $ADD_2$ is "0000", the addition result is "0". This indicates a timing at which the sampled data SD output from the parallel flip flop circuit $DFF_5$ is "B" ("a+b" in FIG. 6A, etc.). When the input to the addition circuit $ADD_2$ is "0001", the addition result is "1". This indicates a timing at which the sampled data SD is "A" ("b" in FIG. 6A, etc.). When the input to the addition circuit $ADD_2$ is "0011", the addition result is "2". This indicates a timing at which the sampled data SD is "0". When the input to the addition circuit $ADD_2$ is "0111", the addition result is "3". This indicates a timing at which the sampled data SD is "C" ("−b" in FIG. 6A, etc.). When the input to the addition circuit $ADD_2$ is "1111", the addition result is "4". This indicates a timing at which the sampled data SD is "D" ("−a−b" in FIG. 6A, etc.).

The addition result ("0", "1", "2", "3", "4") from the addition circuit $ADD_2$ as illustrated in FIG. 8M is input to the maximum/minimum value detection circuit DET. The maximum/minimum value detection circuit DET provides the asymmetry information calculation enable instruction Ea (see FIG. 8N) to the asymmetry calculation means 60. The asymmetry information calculation enable instruction Ea is output (or, strictly speaking, "is active") only when the addition result is "0" or "4". As can be seen from FIG. 8M and FIG. 8O, the output addition result being "0" corresponds to the value of the sampled data SD being "B" ("a+b" in FIG. 6A, etc.), and the output addition result being "4" corresponds to the value of the sampled data SD being "D" ("−a−b" in FIG. 6A, etc.).

The asymmetry calculation means 60 includes the n-bit parallel flip flop circuit $DFF_5$ which is provided as a delay element, a selector $SEL_2$, an addition circuit $ADD_3$, a selector $SEL_3$, an n-bit parallel flip flop circuit $DFF_6$, an n-bit parallel flip flop circuit $DFF_7$, and a counter $CONT_1$. The structure of each of the n-bit parallel flip flop circuits $DFF_5$, $DFF_6$ and $DFF_7$ is as illustrated in FIG. 4.

When the asymmetry information calculation enable instruction Ea is output from the maximum/minimum value detection circuit DET in the peak value detection means 54, the selector $SEL_2$ receives as the sampled data SD either the maximum value (="B"="a+b") or the minimum value (="D"="−a−b"). Then, the selector $SEL_2$ outputs either the maximum value or the minimum value to the addition circuit $ADD_3$. Otherwise, i.e., when the asymmetry information calculation enable instruction Ea is not being output from the maximum/minimum value detection circuit DET, the selector $SEL_2$ selects and outputs the fixed value "0" to the addition circuit $ADD_3$ (FIG. 8P). The addition circuit $ADD_3$ adds an n-bit accumulation value (FIG. 8T) which is stored in the n-bit parallel flip flop circuit $DFF_6$ as a register to the output value from the selector $SEL_2$. The addition result (FIG. 8S) is accumulated in the n-bit parallel flip flop circuit $DFF_6$ as a register via the selector $SEL_3$. Thus, the n-bit parallel flip flop circuit $DFF_6$ as a register only accumulates the maximum value and the minimum value of the sampled data SD. This is equivalent to calculating the asymmetry amount in the reproduced signal from the optical disk 27.

As illustrated in FIG. 8Q, the counter $CONT_1$ counts the number of times the asymmetry information calculation enable instruction Ea is input from the maximum/minimum value detection circuit DET. When the count reaches a predetermined value, the counter $CONT_1$ outputs an enable signal (FIG. 8R) to the n-bit parallel flip flop circuit $DFF_7$ as a gate so as to open the gate, thereby outputting the current accumulation value obtained by accumulating the maximum value and the minimum value as the digital asymmetry information As (FIG. 8U) to the optical disk controller 39.

At this time, the counter $CONT_1$ controls the selector $SEL_3$ to select the fixed value "0". As a result, the accumulation value in the n-bit parallel flip flop circuit $DFF_6$ as a register is reset to "0".

Figure 9A:
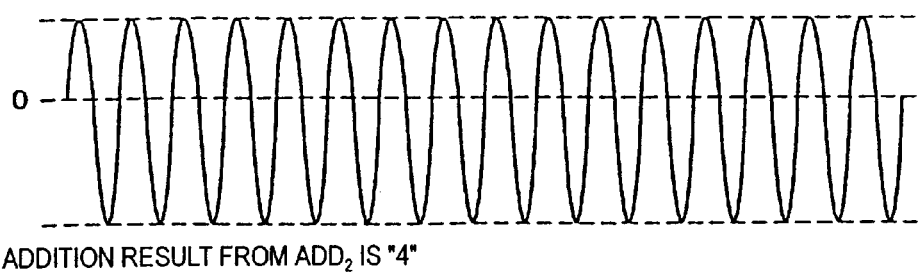
FIG. 9A and FIG. 9B each illustrate an example of a reproduced signal which has asymmetry.
Figure 9B:
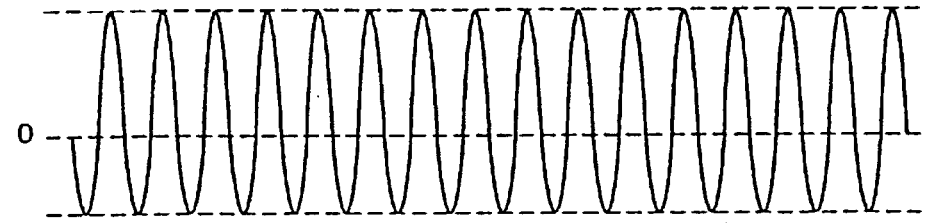

FIG. 9A and FIG. 9B each illustrate an example of a reproduced signal which has asymmetry. In the case of a reproduced signal as illustrated in FIG. 9A, the detected asymmetry amount is a negative value, whereby the output digital asymmetry information As is also a negative value. As a result, the optical disk controller 39 outputs to the recording compensation circuit 41 recording parameters such that the asymmetry amount is shifted toward the positive side. In the case of a reproduced signal as illustrated in FIG. 9B, the detected asymmetry amount is a positive value, whereby the output digital asymmetry information As is also a positive value. As a result, the optical disk controller 39 outputs to the recording compensation circuit 41 recording parameters such that the asymmetry amount is shifted toward the negative side. The recording compensation circuit 41 controls the laser driving circuit 42 so that the laser driving circuit 42 outputs an appropriate laser emission control pulse waveform. The optical disk controller 39 repeats the calibration operation as described above based on the asymmetry detection result until the asymmetry amount is within a predetermined asymmetry amount, thus ensuring an intended performance of the disk recording/reproduction apparatus.

While FIG. 9A and FIG. 9B each illustrate a reproduced signal which is a repetition of a particular pattern, the asymmetry detection process block 37 having the structure as described above is capable of detecting the asymmetry amount even when the reproduced signal is a random pattern reproduced signal.

Figure 10:
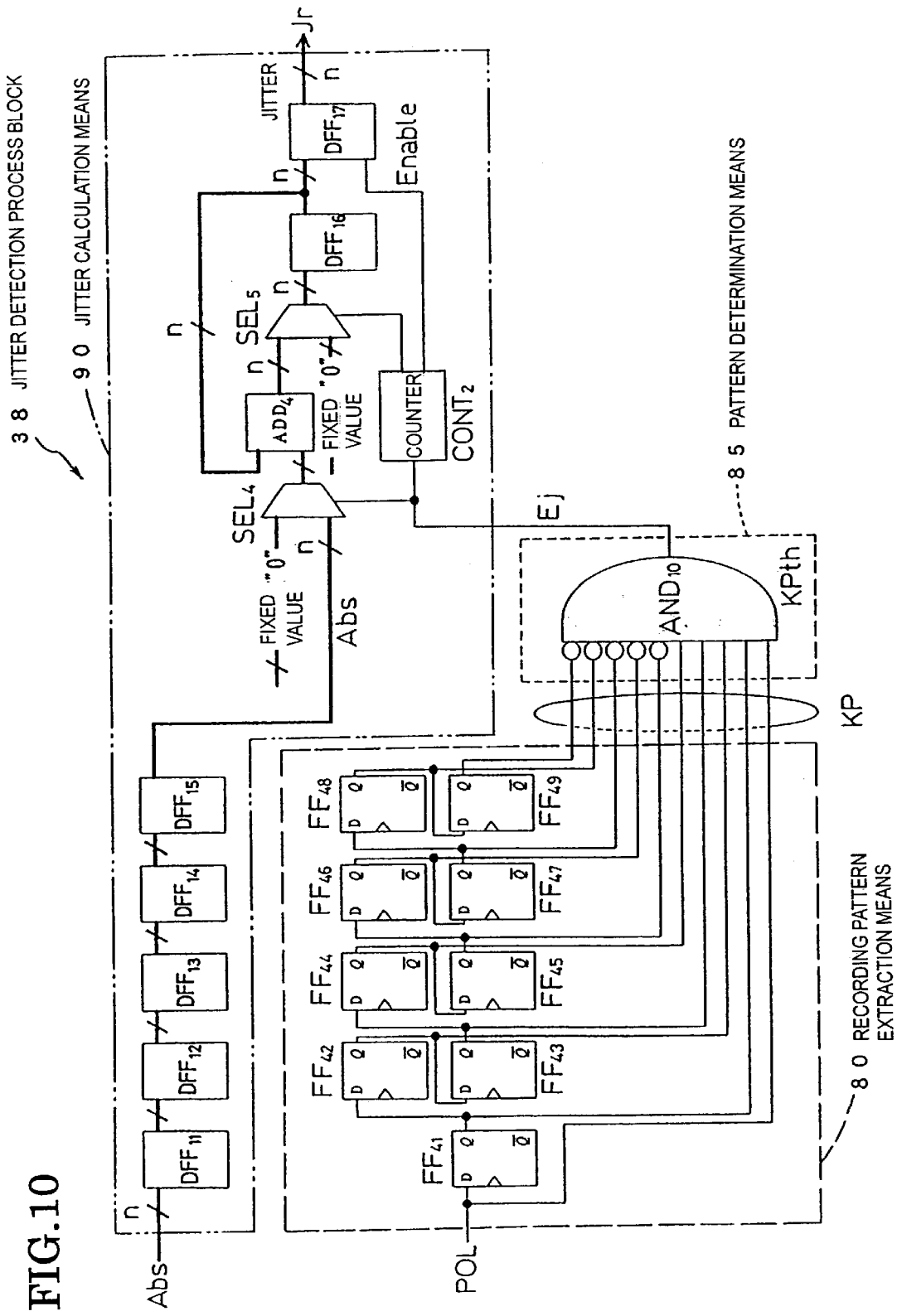
FIG. 10 is a circuit diagram illustrating recording pattern extraction means, pattern determination means and jitter calculation means in the jitter detection process block illustrated in FIG. 2.

FIG. 10 illustrates the structure of the jitter detection process block 38. The jitter detection process block 38 includes the recording pattern extraction means 80, the pattern determination means 85 and the jitter calculation means 90.

The recording pattern extraction means 80 receives the polarity determination information POL from the sample polarity determination means 52, and extracts the recording pattern KP of the sampled data SD by successively shifting the polarity determination information POL with a clock signal. The recording pattern extraction means 80 has a structure of a shift register in which nine flip flops $FF_{41}$ to $FF_{49}$ are connected in a cascaded manner.

The pattern determination means 85 includes a ten-input AND gate $AND_{10}$ which is provided as a logic circuit in which the reference pattern KPth is prestored. The input to the flip flop $FF_{41}$ in the first stage in the recording pattern extraction means 80 and the respective outputs from the first four flip flops $FF_{41}$ to $FF_{44}$ are directly connected to five input terminals of the ten-input AND gate $AND_{10}$. The respective outputs from the latter five flip flops $FF_{45}$ to $FF_{49}$ are inverted and connected to the other five input terminals of the ten-input AND gate $AND_{10}$. The pattern determination means 85 formed by using the ten-input AND gate $AND_{10}$ extracts the recording pattern KP of the sampled data SD such that the polarity determination information POL changes in a sequence of "0", "0", "0", "0", "0", "1", "1", "1", "1", "1" along the time axis direction.

In the case of the ten-input AND gate $AND_{10}$ as illustrated in FIG. 10, the jitter information calculation enable instruction Ej is output from the ten-input AND gate $AND_{10}$ when detecting "0" from the optical disk 27 for five consecutive channel clocks and then detecting "1" therefrom for five consecutive channel clocks. This is commonly referred to in the art as a detection of a "5T—5T" recording pattern, where "T" means the period of the channel clock.

The jitter calculation means 90 includes five n-bit parallel flip flop circuits $DFF_{11}$ to $DFF_{15}$ which are provided for the purpose of timing adjustment, a selector $SEL_4$, an addition circuit $ADD_4$, a selector $SEL_5$, n-bit parallel flip flop circuits $DFF_{16}$ and $DFF_{17}$, and a counter $CONT_2$. The structure of each of the n-bit parallel flip flop circuits $DFF_{11}$ to $DFF_{17}$ is as illustrated in FIG. 4.

When the ten-input AND gate $AND_{10}$, which is the pattern determination means 85, outputs the jitter information calculation enable instruction Ej, the selector $SEL_4$ receives the phase error absolute value Abs and outputs the received phase error absolute value Abs to the addition circuit $ADD_4$. Otherwise, i.e., when the jitter information calculation enable instruction Ej is not being output from the ten-input AND gate $AND_{10}$, the selector $SEL_4$ selects and outputs the fixed value "0" to the addition circuit $ADD_4$.

When the jitter information calculation enable instruction Ej is being output, the selector $SEL_4$ always receives the phase error absolute value Abs of the sampled data corresponding to the zero crossing point (i.e., the sampled data substantially at a point where the polarity of the sampled data is reversed from one to another) because the timing is adjusted by using the n-bit parallel flip flop circuits $DFF_{11}$ to $DFF_{15}$. The number of the n-bit parallel flip flop circuits (i.e., the number of clocks by which the phase error absolute value Abs is to be delayed) may be determined according to the recording pattern to be detected so that the phase error absolute value Abs of the sampled data substantially at a point where the polarity of the sampled data is reversed from one to another is output when the jitter information calculation enable instruction Ej is being output. In the jitter detection process block 38 of the present embodiment, a recording pattern is extracted by using the polarity determination information POL and the phase error absolute value Abs of the sampled data corresponding to the zero crossing point in the recording pattern is used to calculate a jitter amount.

The addition circuit $ADD_4$ adds the n-bit accumulation value which is stored in the n-bit parallel flip flop circuit $DFF_{16}$ as a register to the n-bit phase error absolute value Abs from the selector $SEL_4$. The addition result is accumulated in the n-bit parallel flip flop circuit $DFF_{16}$ as a register via the selector $SEL_5$. Thus, the n-bit parallel flip flop circuit $DFF_{16}$ as a register accumulates the phase error absolute value Abs for the recording pattern KP.

In this way, it is possible to calculate jitter in a reproduced signal from the optical disk 27 for each recording pattern. The counter $CONT_2$ counts number of times the jitter information calculation enable instruction Ej is input from the ten-input AND gate $AND_{10}$. When the count reaches a predetermined value, the counter $CONT_2$ outputs an enable signal to the n-bit parallel flip flop circuit $DFF_{17}$ as a gate so as to open the gate, thereby outputting the current accumulation value obtained by accumulating the phase error absolute value Abs as the digital jitter information Jr to the optical disk controller 39.

At this time, the counter $CONT_2$ controls the selector $SEL_5$ to select the fixed value "0". As a result, the accumulation value in the n-bit parallel flip flop circuit $DFF_{16}$ as a register is reset to "0".

The optical disk controller 39 outputs to the recording compensation circuit 41 recording parameters such that the jitter amount approaches to zero. The recording compensation circuit 41 controls the laser driving circuit 42 based on the output recording parameters so that the laser driving circuit 42 outputs an appropriate laser emission control pulse waveform. The optical disk controller 39 repeats the calibration operation as described above based on the jitter detection result until the jitter amount is within a predetermined jitter amount, thus ensuring an intended performance of the disk recording/reproduction apparatus.

The example described above has been directed to detection of jitter for a 5T-5T recording pattern KP. However, since the recording patterns KPj (j=1, 2, 3, . . . ) for each of which jitter is to be obtained are previously known, the recording/reproduction apparatus is provided with the pattern determination means 85 for each of the recording patterns KPj. When the number of bits input to the pattern determination means 85 is 10, the recording pattern extraction means 80 and the five n-bit parallel flip flop circuits DFF$_{11}$ to DFF$_{15}$ in the jitter calculation means 90 can be used. Otherwise, however, it is necessary to provide the recording pattern extraction means 80 and a delay element (a shift register) for each of the recording pattern.

As described above, it is possible to provide as many jitter detection process blocks 38 as the number of recording patterns which need to be calibrated, whereby even when reproducing recorded information having a random sequence of different recording patterns, it is possible to extract a predetermined recording pattern from a reproduced signal and to obtain a jitter amount for the extracted recording pattern. Therefore, in such a case, it is possible to achieve a desirable recording parameter calibration operation.

As described above, in the recording/reproduction apparatus of the present embodiment, a waveform-shaped reproduced signal is quantized by the A/D converter 30, and the quantized data is subjected to a partial response equalization operation. In the asymmetry detection process block 37, level of each of the obtained sampled values is determined, and only those sampled values which have either the maximum level or the minimum level are accumulated. The jitter detection process block 38 detects a jitter amount for a particular pattern in the reproduced signal. Based on the detected asymmetry amount and the jitter amount, the optical disk controller 39 optimizes the recording parameters and performs a calibration operation so that each of the asymmetry amount and the jitter amount is less than or equal to a predetermined acceptable value. Thus, it is possible to reduce the influence of possible characteristic variations among different optical disks and disk recording/reproduction apparatuses, thereby realizing a recording operation with a high reliability.

While the present invention has been described above with respect to the particular embodiment thereof, the present invention is not limited to the embodiment described above, but has other embodiments as follows.

In the embodiment described above, the jitter detection process block 38 is designed to accumulate the phase error absolute value Abs. Alternatively, the jitter detection process block 38 may be designed to accumulate the square of the phase error so as to output as the digital jitter information Jr the accumulation value after passage of a predetermined period of time or the accumulation value after a predetermined number of addition operations.

In the embodiment described above, the sampled value of the sampled data SD corresponding to the zero crossing point is directly used as the phase error and the phase error absolute value. Alternatively, sampled values before and after a zero crossing point may be used to obtain the gradient of the rising or falling edge so as to normalize the sampled value of the sampled data SD corresponding to the zero crossing point (i.e., so as to convert the sampled value into an amount of shift along the time axis direction), whereby the normalized or converted version of the sampled value can be used for the phase error and the phase error absolute value.

In the embodiment described above, the asymmetry detection process block 37 performs the multi-level determination operation by directly using the sampled data SD as it is output from the band limitation circuit 31, so as to calculate the digital asymmetry information As. Alternatively, the multi-level determination of the sampled data may be performed indirectly by using a decoding result from the Viterbi decoder 44 in a subsequent stage, so as to obtain the asymmetry amount by identifying data having a maximum value and data having a minimum value based on the result of the indirect determination.

In the embodiment described above, the polarity determination information POL is produced based on the sampled data SD output from the band limitation circuit 31 so as to calculate the digital jitter information Jr based on the produced polarity determination information POL. Alternatively, the recording pattern KPj may be detected by using the decoding result from the Viterbi decoder 44 so as to obtain the jitter amount from the detection result.

As described above, according to the present invention, it is possible to appropriately detect jitter and asymmetry in a reproduced signal by using data which has been sampled with a sampling clock which is in synchronization with the reproduced signal. Therefore, it is possible to detect jitter or asymmetry in a reproduced signal with a recording/reproduction apparatus having a digital signal processing circuit which is compliant with the PRML method without unnecessarily increasing the circuit scale. Thus, it is possible to optimize the recording parameters based on the detected jitter and asymmetry and to record digital information by using the optimized recording parameters, thereby improving the quality of the reproduced signal.

We claim:

1. An asymmetry detection apparatus for detecting asymmetry in a reproduced signal which is obtained by reproducing digital information recorded on an information carrier, the asymmetry detection apparatus comprising:
   a clock signal generator for generating a clock signal based on the reproduced signal;
   an A/D converter for sampling the reproduced signal in synchronization with the clock signal;
   a determiner for determining whether a level of each of a plurality of sampled data obtained by the sampling operation is equal to or greater than a predetermined level; and
   a detector for selecting predetermined ones of the plurality of sampled data based on an output from the determiner so as to detect asymmetry in the reproduced signal by using the selected predetermined ones of the plurality of sampled data.

2. An asymmetry detection apparatus according to claim 1, wherein the detector selects one of the plurality of sampled data which has a maximum value and another one of the plurality of sampled data which has a minimum value based on the output from the determiner.

3. An asymmetry detection apparatus according to claim 2, wherein the detector detects asymmetry in the reproduced signal by accumulating the sampled data which has the maximum value and the sampled data which has the minimum value.

4. An asymmetry detection apparatus according to claim 2, wherein the determiner obtains polarity information of the sampled data, and the detector identifies one of the plurality of sampled data which has the maximum value and another one of the plurality of sampled data which has the minimum value based on the polarity.

5. An asymmetry detection apparatus according to claim 1, wherein the clock signal generator detects a phase error between the reproduced signal and the clock signal by using the sampled data so as to perform a feedback control on the clock signal based on the detected phase error.

6. A recording/reproduction apparatus, comprising:
   (a) an asymmetry detection apparatus for detecting asymmetry in a reproduced signal which is obtained by reproducing digital information recorded on an information carrier, the asymmetry detection apparatus comprising:
(i) a clock signal generator for generating a clock signal based on the reproduced signal; an A/D converter for sampling the reproduced signal in synchronization with the clock signal,
(ii) a determiner for determining whether a level of each of a plurality of sampled data obtained by the sampling operation is equal to or greater than a predetermined level, and
(iii) a detector for selecting predetermined ones of the plurality of sampled data based on an output from the determiner so as to detect asymmetry in the reproduced signal by using the selected predetermined ones of the plurality of sampled data;

(b) a recording parameter setting section for setting a recording parameter based on the asymmetry in the reproduced signal detected by the asymmetry detection apparatus; and (c) a recording apparatus for recording digital information on the information carrier by using the recording parameter.

7. A jitter detection apparatus for detecting jitter in a reproduced signal which is obtained by reproducing digital information recorded on an information carrier, the jitter detection apparatus comprising:

a clock signal generator for generating a clock signal based on the reproduced signal;

an A/D converter for sampling the reproduced signal in synchronization with the clock signal;

a determiner for determining whether a level of each of a plurality of sampled data obtained by the sampling operation is equal to or greater than a predetermined level; and a detector for detecting jitter in the reproduced signal by using predetermined ones of the plurality of sampled data based on an output from the determiner.

8. A jitter detection apparatus according to claim 7, wherein the determiner obtains polarity information of the sampled data.

9. A jitter detection apparatus according to claim 8, wherein the detector detects jitter in the reproduced signal by using the sampled data substantially at a point where the polarity of the sampled data is reversed from one to another.

10. A jitter detection apparatus according to claim 7, wherein the detector accumulates absolute values of phase errors of the predetermined ones of the sampled data.

11. A jitter detection apparatus according to claim 7, wherein a signal pattern which is formed by the plurality of sampled data is detected based on the output from the determiner.

12. A jitter detection apparatus according to claim 11, wherein jitter for a predetermined pattern is detected by detecting the jitter when it is determined that the signal pattern is equal to the predetermined pattern.

13. A recording/reproduction apparatus, comprising:
(a) a jitter detection apparatus for detecting jitter in a reproduced signal which is obtained by reproducing digital information recorded on an information carrier, the jitter detection apparatus comprising:
(i) a clock signal generator for generating a clock signal based on the reproduced signal; an A/D converter for sampling the reproduced signal in synchronization with the clock signal,
(ii) a determiner for determining whether a level of each plurality of sampled data obtained by the sampling operation is equal to or greater than a predetermined level, and
(iii) a detector for detecting jitter in the reproduced signal by using predetermined ones of the plurality of sampled data based on an output from the determiner;

(b) a recording parameter setting section for setting a recording parameter based on the jitter in the reproduced signal detected by the jitter detection apparatus; and (c) a recording apparatus for recording digital information on the information carrier by using the recording parameter.

14. A method for detecting asymmetry in a reproduced signal which is obtained by reproducing digital information recorded on an information carrier, the asymmetry detection method comprising the steps of:

generating a clock signal based on the reproduced signal;

sampling the reproduced signal in synchronization with the clock signal; and detecting asymmetry in the reproduced signal by accumulating selected ones of a plurality of sampled data obtained by the sampling operation.

15. A method for detecting jitter in a reproduced signal which is obtained by reproducing digital information recorded on an information carrier, the jitter detection method comprising the steps of:

generating a clock signal based on the reproduced signal;

sampling the reproduced signal in synchronization with the clock signal; and detecting jitter in the reproduced signal by accumulating selected ones of a plurality of sampled data obtained by the sampling operation.

16. An asymmetry detection method, comprising the steps of:

obtaining equalized outputs of multiple levels through a partial response equalization operation of a reproduced signal from an information carrier; and detecting asymmetry in the reproduced signal by accumulating one of the equalized outputs which has a maximum value and another one of the equalized outputs which has a minimum value.

* * * * *